United States Patent [19]
Sasaki et al.

[11] Patent Number: 5,890,360
[45] Date of Patent: Apr. 6, 1999

[54] COMPRESSION IGNITION TYPE ENGINE

[75] Inventors: Shizuo Sasaki, Numazu; Satoshi Iguchi, Mishima; Takekazu Ito; Tsukasa Abe, both of Susono, all of Japan

[73] Assignee: Toyota Jidosha Kabushiki Kaisha, Toyota, Japan

[21] Appl. No.: 146,431

[22] Filed: Sep. 3, 1998

[30] Foreign Application Priority Data

Sep. 16, 1997 [JP] Japan .................................... 9-250949
Nov. 7, 1997 [JP] Japan .................................... 9-305770

[51] Int. Cl.⁶ ........................................................ F02M 25/06
[52] U.S. Cl. .............................. 60/278; 60/276; 60/298; 60/285
[58] Field of Search ............................. 60/278, 276, 285, 60/298, 301; 701/108; 123/435, 568.21, 568.26

[56] References Cited

U.S. PATENT DOCUMENTS

| | | | |
|---|---|---|---|
| 4,142,493 | 3/1979 | Schira et al. | 123/119 |
| 4,454,854 | 6/1984 | Gotoh et al. | 123/571 |
| 5,172,550 | 12/1992 | Takeshima | 60/278 |
| 5,482,020 | 1/1996 | Shimizu et al. | 123/417 |
| 5,632,144 | 5/1997 | Isobe | 60/277 |
| 5,732,554 | 3/1998 | Sasaki et al. | 60/278 |

FOREIGN PATENT DOCUMENTS

| | | |
|---|---|---|
| A-4-334750 | 11/1992 | Japan . |
| A-6-346763 | 12/1994 | Japan . |
| A-7-4287 | 1/1995 | Japan . |

OTHER PUBLICATIONS

Yasuo Sato et al., "A Simultaneous Reduction of $No_x$ and Soot in Diesel Engines Under a New Combustion System", Paper No. 205, Spring Symposium 1996, Society of Automotive Engineers of Japan, pp. 81–84.

Primary Examiner—Thomas E. Denion
Assistant Examiner—Binh Tran
Attorney, Agent, or Firm—Oliff & Berridge, PLC

[57] ABSTRACT

A compression ignition type engine, which switches between a first combustion where the amount of the inert gas in the combustion chamber is larger than the amount of inert gas where the amount of production of soot peaks and almost no soot is produced and a second combustion where the amount of inert gas in the combustion chamber is smaller than the amount of inert gas where the amount of production of soot peaks. The second combustion is provided instead of the first combustion when a catalyst is not activated.

17 Claims, 24 Drawing Sheets

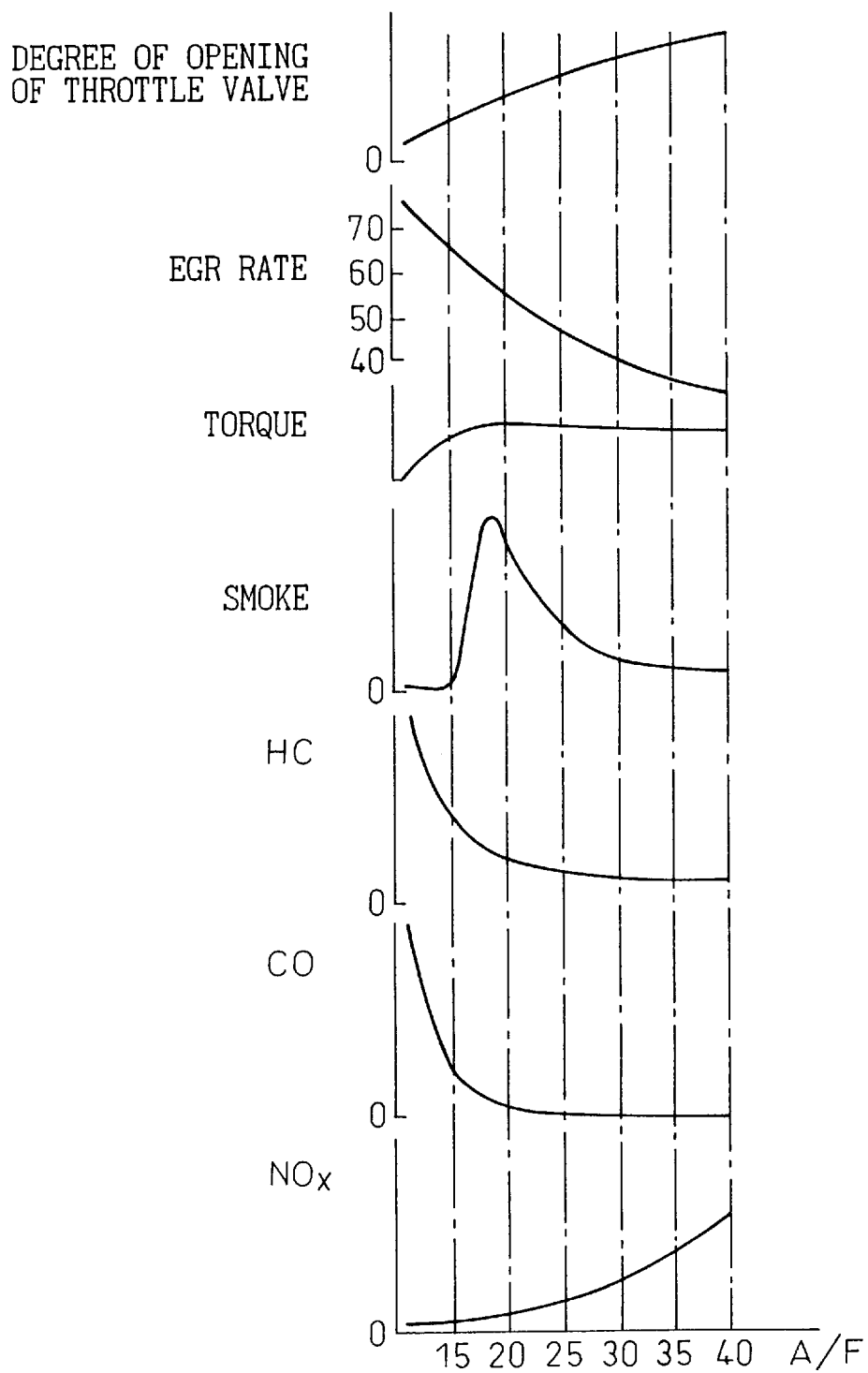

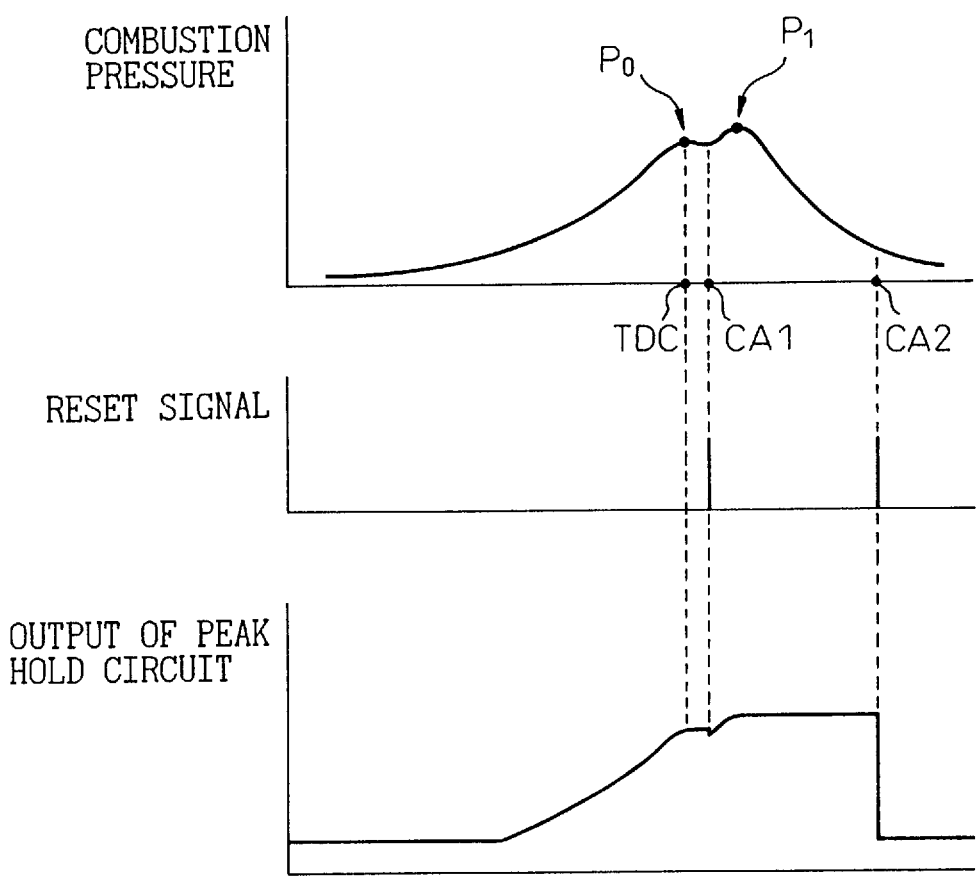

Fig.27A $$\begin{array}{c|cccc}
L & \theta S_{11} & \theta S_{12} & \cdots\cdots & \theta S_{1n} \\
& \theta S_{21} & & & \vdots \\
& \vdots & & & \vdots \\
& \theta S_{m1} & \cdots\cdots\cdots & & \theta S_{mn} \\
\hline
& & & & N
\end{array}$$

Fig.27B $$\begin{array}{c|cccc}
L & \theta\min_{11} & \theta\min_{12} & \cdots\cdots & \theta\min_{1n} \\
& \theta\min_{21} & & & \vdots \\
& \vdots & & & \vdots \\
& \theta\min_{m1} & \cdots\cdots\cdots\cdots & & \theta\min_{mn} \\
\hline
& & & & N
\end{array}$$

COMPRESSION IGNITION TYPE ENGINE

BACKGROUND OF THE INVENTION

1. Field of the Invention

The present invention relates to a compression ignition type engine.

2. Description of the Related Art

In the past, in an internal combustion engine, for example, a diesel engine, the production of NOx has been suppressed by connecting the engine exhaust passage and the engine intake passage by an exhaust gas recirculation (EGR) passage so as to cause the exhaust gas, that is, the EGR gas, to recirculate in the engine intake passage through the EGR passage. In this case, the EGR gas has a relatively high specific heat and therefore can absorb a large amount of heat, so the larger the amount of EGR gas, that is, the higher the EGR rate (amount of EGR gas/(amount of EGR gas+amount of intake air), the lower the combustion temperature in the engine intake passage. When the combustion temperature falls, the amount of NOx produced falls and therefore the higher the EGR rate, the lower the amount of NOx produced.

In this way, in the past, the higher the EGR rate, the lower the amount of NOx produced can become. If the EGR rate is increased, however, the amount of soot produced, that is, the smoke, starts to sharply rise when the EGR rate passes a certain limit. In this point, in the past, it was believed that if the EGR rate was increased, the smoke would increase without limit. Therefore, it was believed that the EGR rate at which smoke starts to rise sharply was the maximum allowable limit of the EGR rate.

Therefore, in the past, the EGR rate was set within a range not exceeding the maximum allowable limit (for example, see Japanese Unexamined Patent Publication (Kokai) No. 4-334750). The maximum allowable limit of the EGR rate differed considerably according to the type of the engine and the fuel, but was from 30 percent to 50 percent or so. Accordingly, in conventional diesel engines, the EGR rate was suppressed to 30 percent to 50 percent at a maximum.

Since it was believed in the past that there was a maximum allowable limit to the EGR rate, in the past the EGR rate had been set so that the amount of NOx and smoke produced would become as small as possible within a range not exceeding that maximum allowable limit. Even if the EGR rate is set in this way so that the amount of NOx and smoke produced becomes as small as possible, however, there are limits to the reduction of the amount of production of NOx and smoke. In practice, therefore, a considerable amount of NO and smoke continues being produced.

The present inventors, however, discovered in the process of studies on the combustion in diesel engines that if the EGR rate is made larger than the maximum allowable limit, the smoke sharply increases as explained above, but there is a peak to the amount of the smoke produced and once this peak is passed, if the EGR rate is made further larger, the smoke starts to sharply decrease and that if the EGR rate is made at least 70 percent during engine idling or if the EGR gas is force cooled and the EGR rate is made at least 55 percent or so, the smoke will almost completely disappear, that is, almost no soot will be produced. Further, they found that the amount of NOx produced at this time was extremely small. They engaged in further studies later based on this discovery to determine the reasons why soot was not produced and as a result constructed a new system of combustion able to simultaneously reduce the soot and NOx more than ever before. This new system of combustion will be explained in detail later, but briefly it is based on the idea of stopping the growth of hydrocarbons into soot at a stage before the hydrocarbons grow to soot.

That is, what was found from repeated experiments and research was that the growth of hydrocarbons into soot stops at a stage before that happens when the temperatures of the fuel and the gas around the fuel at the time of combustion in the combustion chamber are lower than a certain temperature and the hydrocarbons grow to soot all at once when the temperatures of the fuel and the gas around the fuel become higher than a certain temperature. In this case, the temperatures of the fuel and the gas around the fuel are greatly affected by the heat absorbing action of the gas around the fuel at the time of combustion of the fuel. By adjusting the amount of heat absorbed by the gas around the fuel in accordance with the amount of heat generated at the time of combustion of the fuel, it is possible to control the temperatures of the fuel and the gas around the fuel.

Therefore, if the temperatures of the fuel and the gas around the fuel at the time of combustion in the combustion chamber are suppressed to less than the temperature at which the growth of the hydrocarbons stops midway, soot is no longer produced. The temperatures of the fuel and the gas around the fuel at the time of combustion in the combustion chamber can be suppressed to less than the temperature at which the growth of the hydrocarbons stops midway by adjusting the amount of heat absorbed by the gas around the fuel. On the other hand, the hydrocarbons stopped in growth midway before becoming soot can be easily removed by after-treatment using an oxidation catalyst etc. This is the basic thinking behind this new system of combustion.

This new combustion system, however, is based on the idea of removing the hydrocarbons etc., which have stopped growing midway before turning into soot, by the use of an oxidation catalyst etc., and accordingly, when the oxidation catalyst etc. is not activated, it is impossible to carry out this new combustion. Further, this new type of combustion does not occur unless all the conditions for it are satisfied, therefore just because the oxidation catalyst etc. is activated does not mean that this new combustion is always being performed. That is, in this new combustion system, it is necessary to suitably determine when to perform this new combustion. Further, use of this new combustion enables simultaneous reduction of the soot and NOx. Therefore, it is desirable to use this new combustion as much as possible.

SUMMARY OF THE INVENTION

An object of the present invention is to provide a compression ignition type engine capable of carrying out low temperature combustion while preventing unburnt hydrocarbons from being discharged to the outside air.

According to the present invention, there is provided a compression ignition type engine in which an amount of production of soot gradually increases and then peaks when an amount of inert gas in a combustion chamber increases and in which a further increase of the amount of inert gas in the combustion chamber results in a temperature of fuel and surrounding gas at the time of combustion in the combustion chamber becoming lower than a temperature of production of soot and therefore almost no production of soot any longer, the engine comprising: switching means for selectively switching between a first combustion where the amount of the inert gas in the combustion chamber is larger than the amount of inert gas where the amount of production of soot peaks and almost no soot is produced and a second combustion where the amount of inert gas in the combustion chamber is smaller than the amount of inert gas where the amount of production of soot peaks; a catalyst having an oxidation function arranged in an exhaust passage of the engine; and activation judging means for judging if the catalyst is activated or not; the switching means making the second combustion be performed and the first combustion not be performed when the catalyst is not activated.

BRIEF DESCRIPTION OF THE DRAWINGS

The present invention may be more fully understood from the description of the preferred embodiments of the invention set forth below together with the accompanying drawings, in which:

FIG. 2 is a view of the amount of generation of smoke and NOx;

FIG. 19 is a view of a combustion pressure etc.;

FIGS. 27A and 27B are views of maps of a target injection start timing etc.

DESCRIPTION OF THE PREFERRED EMBODIMENTS

Figure 1:
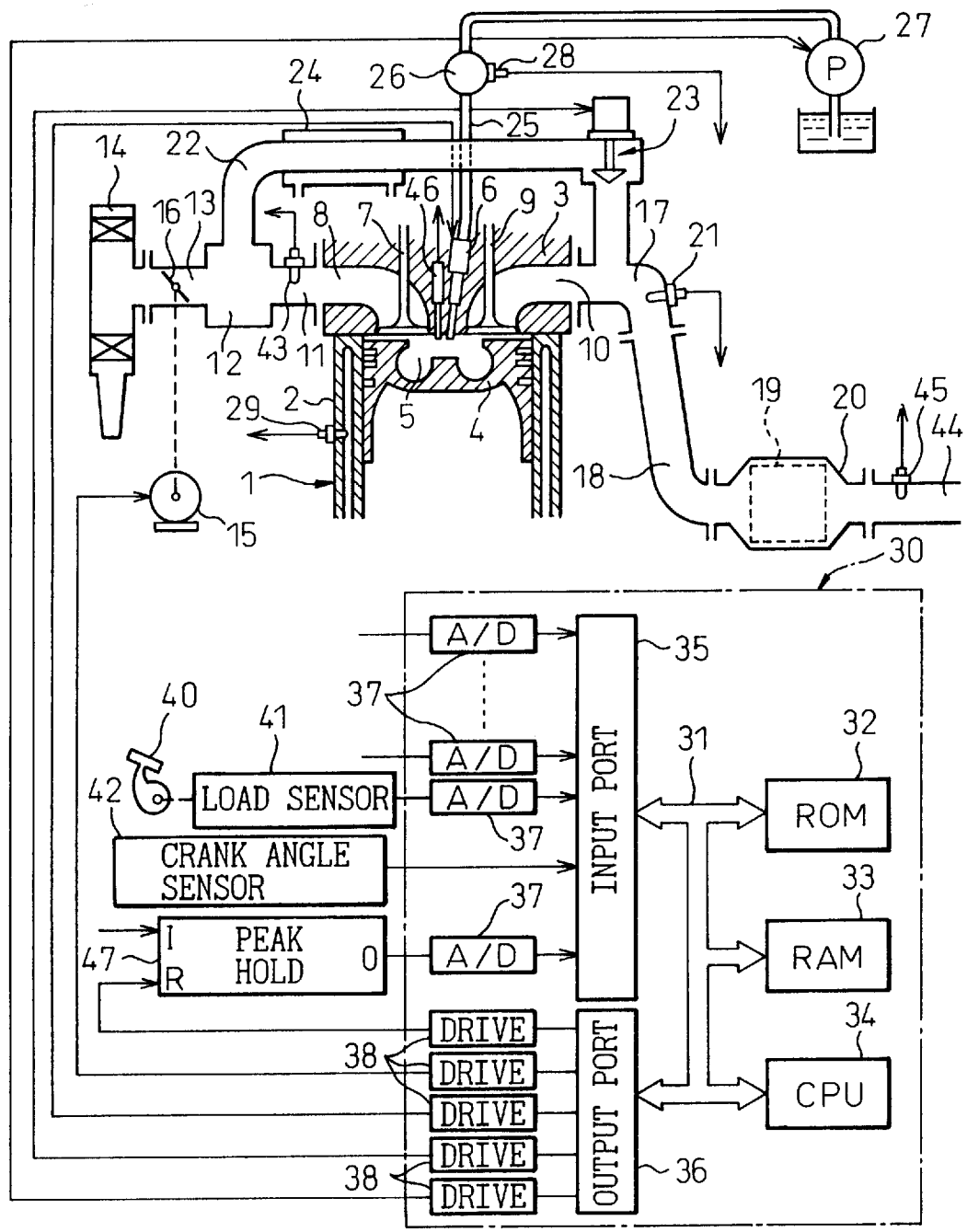
FIG. 1 is an overall view of a compression ignition type engine.

FIG. 1 is a view of the case of application of the present invention to a four-stroke compression ignition type engine.

Referring to FIG. 1, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to the surge tank 12. The surge tank 12 is connected through an intake duct 13 to an air cleaner 14. A throttle valve 16 driven by an electric motor 15 is arranged in the intake duct 13. On the other hand, the exhaust port 10 is connected through an exhaust manifold 17 and exhaust tube 18 to a catalytic converter 20 housing a catalyst 19 having an oxidation action. An air fuel ratio sensor 21 is arranged in the exhaust manifold 17.

The exhaust manifold 17 and surge tank 12 are connected with each other through an EGR passage 22. An electrically controlled EGR control valve 23 is arranged in an EGR passage 22. Further, a cooling apparatus 24 for cooling the EGR gas flowing through the EGR passage 22 is provided around the EGR passage 22. In the embodiment shown in FIG. 1, the engine cooling water is guided to the cooling apparatus 24 where the engine cooling water is used to cool the EGR gas.

On the other hand, each fuel injector 6 is connected through a fuel supply tube 25 to the fuel reservoir, that is, a common rail 26. Fuel is supplied to the common rail 26 from an electrically controlled variable discharge fuel pump 27. Fuel supplied in the common rail 26 is supplied through each fuel supply tube 25 to the fuel injectors 6. A fuel pressure sensor 28 for detecting the fuel pressure in the common rail 26 is attached to the common rail 26. The amount of discharge of the fuel pump 27 is controlled based on the output signal of the fuel pressure sensor 28 so that the fuel pressure in the common rail 26 becomes the target fuel pressure.

The electronic control unit 30 is comprised of a digital computer and is provided with a ROM (read only memory) 32, a RAM (random access memory) 33, a CPU (microprocessor) 34, an input port 35, and an output port 36 connected with each other by a bidirectional bus 31. The output signal of the air fuel ratio sensor 21 is input through a corresponding AD converter 37 to the input port 35. Further, the output signal of the fuel pressure sensor 28 is input through a corresponding AD converter 37 to the input port 35. The engine body 1 is provided with a temperature sensor 29 for detecting the engine cooling water temperature. The output signal of this temperature sensor 29 is input through a corresponding AD converter 37 to the input port 35. Further, a temperature sensor 43 for detecting the temperature of the mixed gas of the suction air and the EGR gas is mounted in at least one of the intake tubes 11. The output signal of the temperature sensor 43 is input through a corresponding AD converter 37 to the input port 35.

Further, a temperature sensor 45 for detecting the temperature of the exhaust gas passing through the catalyst 19 is arranged in the exhaust pipe 44 downstream of the catalyst 19. The output signal of the temperature sensor 45 is input through a corresponding AD converter 37 to the input port 35. A combustion pressure sensor 46 for detecting the pressure inside the combustion chamber 5 is arranged in the combustion chamber 5. The output signal of the combustion pressure sensor 46 is connected to the input terminal I of a peak hold circuit 47. The output terminal O of the peak hold circuit 47 is connected through a corresponding AD converter 37 to the input port 35.

The accelerator pedal 40 has connected to it a load sensor 41 for generating an output voltage proportional to the amount of depression L of the accelerator pedal 40. The output voltage of the load sensor 41 is input through a corresponding AD converter 37 to the input port 35. Further, the input port 35 has connected to it a crank angle sensor 42 for generating an output pulse each time the crankshaft rotates by for example 30°. On the other hand, the output port 36 has connected to it through a corresponding drive circuit 38 the fuel injector 6, electric motor 15, EGR control valve 23, fuel pump 27, and a reset input terminal R of the peak hold circuit 47.

FIG. 2 shows an example of an experiment showing the changes in the output torque and the changes in the amount of smoke, HC, CO, and NOx exhausted when changing the air fuel ratio A/F (abscissa in FIG. 2) by changing the opening degree of the throttle valve 16 and the EGR rate at the time of engine low load operation. As will be understood from FIG. 2, in this experiment, the EGR rate becomes larger the smaller the air fuel ratio A/F. When below the stoichiometric air fuel ratio (≈14.6), the EGR rate becomes over 65 percent.

As shown in FIG. 2, if increasing the EGR rate to reduce the air fuel ratio A/F, when the EGR rate becomes close to 40 percent and the air fuel ratio A/F becomes 30 degrees or so, the amount of smoke produced starts to increase. Next, when the EGR rate is further raised and the air fuel ratio A/F is made smaller, the amount of smoke produced sharply increases and peaks. Next, when the EGR rate is further raised and the air-fuel ratio A/F is made smaller, the smoke sharply falls. When the EGR rate is made over 65 percent and the air fuel ratio A/F becomes close to 15.0, the smoke produced becomes substantially zero. That is, almost no soot is produced any longer. At this time, the output torque of the engine falls somewhat and the amount of NOx produced becomes considerably lower. On the other hand, at this time, the amounts of HC and CO produced start to increase.

Figure 3A:
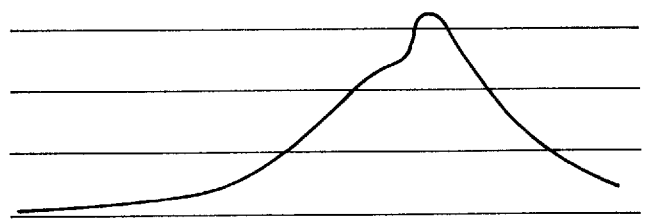
FIGS. 3A and 3B are views of the combustion pressure.
Figure 3B:
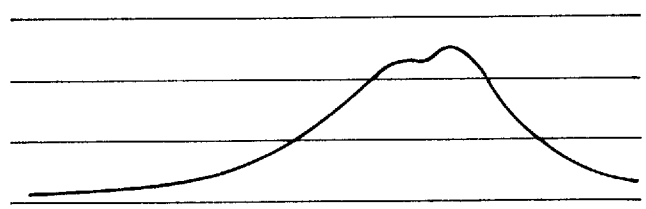

FIG. 3A shows the changes in compression pressure in the combustion chamber 5 when the amount of smoke produced is the greatest near an air fuel ratio A/F of 21. FIG. 3B shows the changes in compression pressure in the combustion chamber 5 when the amount of smoke produced is substantially zero near an air fuel ratio A/F of 18. As will be understood from a comparison of FIG. 3A and FIG. 3B, the combustion pressure is lower in the case shown in FIG. 3B where the amount of smoke produced is substantially zero than the case shown in FIG. 3A where the amount of smoke produced is large.

The following may be said from the results of the experiment shown in FIG. 2 and FIGS. 3A and 3B. That is, first, when the air fuel ratio A/F is less than 15.0 and the amount of smoke produced is substantially zero, the amount of NOx produced falls considerably as shown in FIG. 2. The fact that the amount of NOx produced falls means that the combustion temperature in the combustion chamber 5 falls. Therefore, it can be said that when almost no soot is produced, the combustion temperature in the combustion chamber 5 becomes lower. The same thing may be said from FIG. 3B. That is, in the state shown in FIG. 3B where almost no soot is produced, the combustion pressure becomes lower, therefore the combustion temperature in the combustion chamber 5 becomes lower at this time.

Figure 4:
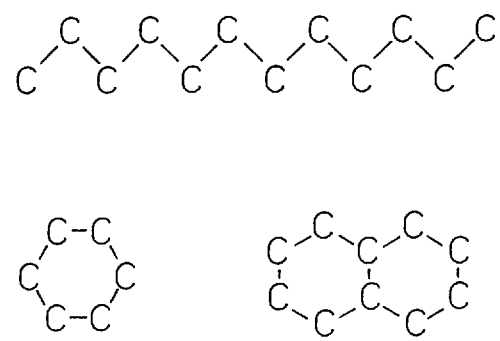
FIG. 4 is a view of a fuel molecule.

Second, when the amount of smoke produced, that is, the amount of soot produced, becomes substantially zero, as shown in FIG. 2, the amounts of HC and CO exhausted increase. This means that the hydrocarbons are exhausted without growing into soot. That is, the straight chain hydrocarbons and aromatic hydrocarbons contained in the fuel and shown in FIG. 4 decompose when raised in temperature in an oxygen poor state resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons shown in FIG. 4 grow to soot through the soot precursor. Therefore, as explained above, when the amount of production of soot becomes substantially zero, the amount of exhaust of HC and CO increases as shown in FIG. 2, but the HC at this time is a soot precursor or a state of hydrocarbons before that.

Summarizing these considerations based on the results of the experiments shown in FIG. 2 and FIGS. 3A and 3B, when the combustion temperature in the combustion chamber 5 is low, the amount of soot produced becomes substantially zero. At this time, a soot precursor or a state of hydrocarbons before that is exhausted from the combustion chamber 5. More detailed experiments and studies were conducted on this. As a result, it was learned that when the temperatures of the fuel and the gas around the fuel in the combustion chamber 5 are below a certain temperature, the process of growth of soot stops midway, that is, no soot at all is produced and that when the temperature of the fuel and its surroundings in the combustion chamber 5 becomes higher than a certain temperature, soot is produced.

The temperature of the fuel and its surroundings when the process of production of hydrocarbons stops in the state of the soot precursor, that is, the above certain temperature, changes depending on various factors such as the type of the fuel, the air fuel ratio, and the compression ratio, so it cannot be said what degree it is, but this certain temperature is deeply related with the amount of production of NOx. Therefore, this certain temperature can be defined to a certain degree from the amount of production of NOx. That is, the greater the EGR rate, the lower the temperature of the fuel and the gas surrounding it at the time of combustion and the lower the amount of NOx produced. At this time, when the amount of NOx produced becomes around 10 ppm or less, almost no soot is produced any more. Therefore, the above certain temperature substantially matches the temperature when the amount of NOx produced becomes 10 ppm or less.

Once soot is produced, it is impossible to remove it by after-treatment using an oxidation catalyst etc. As opposed to this, a soot precursor or a state of hydrocarbons before this can be easily removed by after-treatment using an oxidation catalyst etc. Considering after-treatment by an oxidation catalyst etc., there is an extremely great difference between whether the hydrocarbons are exhausted from the combustion chamber 5 in the form of a soot precursor or a state before that or exhausted from the combustion chamber 5 in the form of soot. The new combustion system used in the present invention is based on the idea of exhausting the hydrocarbons from the combustion chamber 5 in the form of a soot precursor or a state before that without allowing the production of soot in the combustion chamber 5 and causing the hydrocarbons to oxidize by an oxidation catalyst etc.

Now, to stop the growth of hydrocarbons in the state before the production of soot, it is necessary to suppress the temperatures of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperatures of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas.

In this case, to suppress the temperatures of the fuel and the gas around it to a temperature lower than the temperature at which soot is produced, an amount of inert gas enough to absorb an amount of heat sufficient for lowering the temperatures is required. Therefore, if the amount of fuel increases, the amount of inert gas required increases along with the same. Note that in this case the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use EGR gas as the inert gas.

Figure 5:
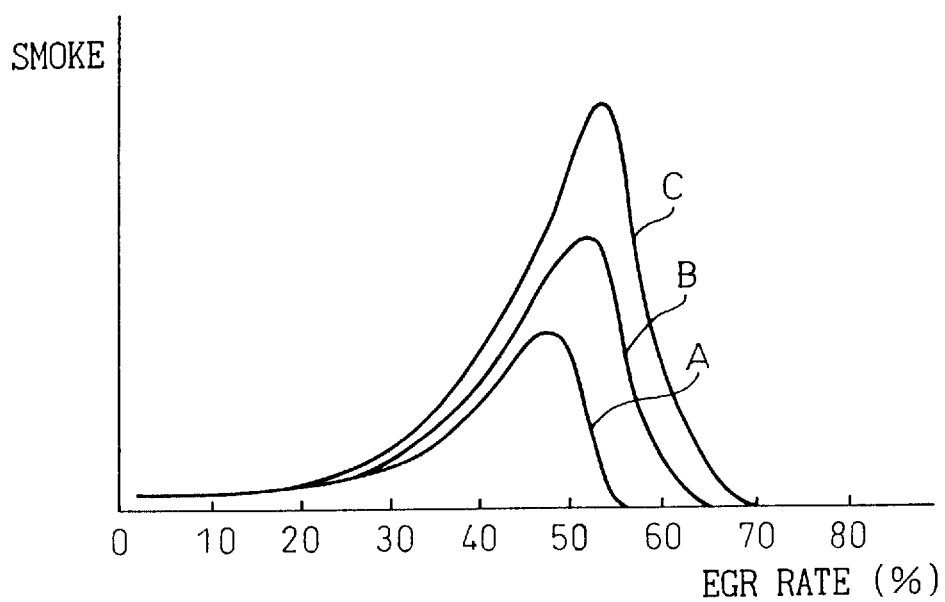
FIG. 5 is a view of the relationship between the amount of smoke and the EGR rate.

FIG. 5 shows the relationship between the EGR rate and the smoke when using EGR gas as the inert gas and changing the degree of cooling of the EGR gas. That is, in FIG. 5, curve A shows the case of force cooling the EGR gas to maintain the temperature of the EGR gas about 90° C., curve B shows the case of cooling the EGR gas using a small sized cooling apparatus, and curve C shows the case of force cooling the EGR gas.

As shown by the curve A of FIG. 5, when force cooling the EGR gas, the amount of production of soot peaks when the EGR rate is slightly lower than 50 percent. In this case, if the EGR rate is made about 55 percent or more, almost no soot is produced any longer.

On the other hand, as shown by the curve B in FIG. 5, when slightly cooling the EGR gas, the amount of production of soot peaks when the EGR rate is slightly higher than 50 percent. In this case, if the EGR rate is made substantially 65 percent or more, almost no soot is produced any longer.

Further, as shown by the curve C in FIG. 5, when not force cooling the EGR gas, the amount of the soot produced peaks at near 55 percent. In this case, if the EGR rate is made about 70 percent or more, almost no soot is produced any longer.

Note that FIG. 5 shows the amount of production of smoke when the engine load is relatively high. When the engine load becomes smaller, the EGR rate where the amount of production of soot peaks falls somewhat and the lower limit of the EGR rate where almost no soot is produced any longer falls somewhat as well. In this way, the lower limit of the EGR rate where almost no soot is being produced any longer changes in accordance with the degree of cooling of the EGR gas and the engine load.

Figure 6:
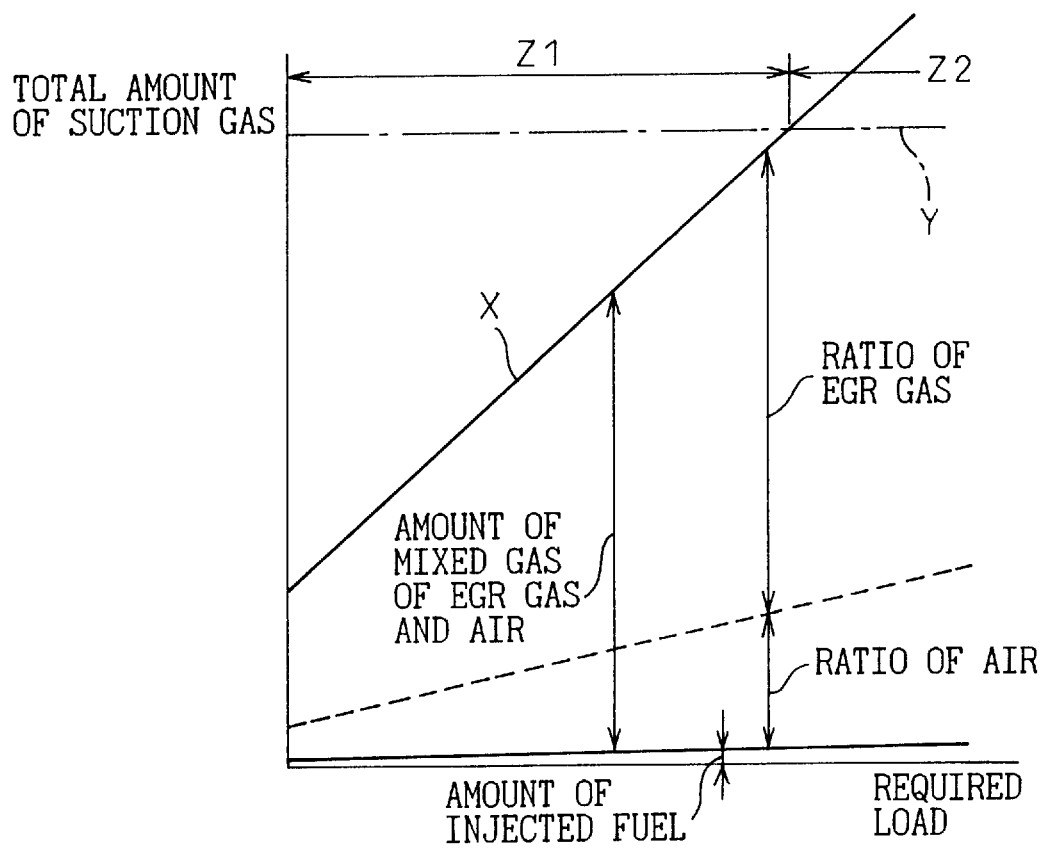
FIG. 6 is a view of the relationship between the amount of injected fuel and the amount of mixed gas.

FIG. 6 shows the case where the shows the amount of mixed gas of EGR gas and air, the ratio of air in the mixed gas, and the ratio of EGR gas in the mixed gas required for making the temperatures of the fuel and the gas around it at the time of combustion a temperature lower than the temperature at which soot is produced in the case of use of EGR gas as an inert gas. Note that in FIG. 6, the ordinate shows the total amount of suction gas taken into the combustion chamber 5. The broken line Y shows the total amount of suction gas able to be taken into the combustion chamber 5 when supercharging is not being performed. Further, the abscissa shows the required load. Z1 shows the low load operating region.

Referring to FIG. 6, the ratio of air, that is, the amount of air in the mixed gas, shows the amount of air necessary for causing the injected fuel to completely burn. That is, in the case shown in FIG. 6, the ratio of the amount of air and the amount of injected fuel becomes the stoichiometric air fuel ratio. On the other hand, in FIG. 6, the ratio of EGR gas, that is, the amount of EGR gas in the mixed gas, shows the minimum amount of EGR gas required for making the temperatures of the fuel and the gas around it a temperature lower than the temperature at which soot is produced. This amount of EGR gas is, expressed in terms of the EGR rate, about at least 55 percent. In the embodiment shown in FIG. 6, it is at least 70 percent. That is, if the total amount of suction gas taken into the combustion chamber 5 is made the solid line X in FIG. 6 and the ratio between the amount of air and amount of EGR gas in the total amount of suction gas X is made the ratio shown in FIG. 6, the temperature of the fuel and the gas around it becomes a temperature lower than the temperature at which soot is produced and therefore no soot at all is produced any longer. Further, the amount of NOx produced at this time is around 10 ppm or less and therefore the amount of NOx produced becomes extremely small.

If the amount of fuel injected increases, the amount of heat generated at the time of combustion increases, so to maintain the temperatures of the fuel and the gas around it at a temperature lower than the temperature at which soot is produced, the amount of heat absorbed by the EGR gas must be increased. Therefore, as shown in FIG. 6, the amount of EGR gas has to be increased the greater the amount of injected fuel. That is, the amount of EGR gas has to be increased as the required load becomes higher.

On the other hand, in the load region Z2 of FIG. 6, the total amount of suction gas X required for inhibiting the production of soot exceeds the total amount of suction gas Y which can be taken in. Therefore, in this case, to supply the total amount of suction gas X required for inhibiting the production of soot into the combustion chamber 5, it is necessary to supercharge or pressurize both of the EGR gas and the suction gas or the EGR gas. When not supercharging or pressurizing the EGR gas etc., in the load region Z2, the total amount of suction gas X matches with the total amount of suction gas Y which can be taken in. Therefore, in the case, to inhibit the production of soot, the amount of air is reduced somewhat to increase the amount of EGR gas and the fuel is made to burn in a state where the air fuel ratio is rich.

As explained above, FIG. 6 shows the case of combustion of fuel at the stoichiometric air fuel ratio. In the low load operating region Z1 shown in FIG. 6, even if the amount of air is made smaller than the amount of air shown in FIG. 6, that is, even if the air fuel ratio is made rich, it is possible to obstruct the production of soot and make the amount of NOx produced around 10 ppm or less. Further, in the low load region Z1 shown in FIG. 6, even if the amount of air is made greater than the amount of air shown in FIG. 6, that is, the mean value of the air fuel ratio is made a lean 17 to 18, it is possible to obstruct the production of soot and make the amount of NOx produced around 10 ppm or less.

That is, when the air fuel ratio is made rich, the fuel becomes in excess, but since the fuel temperature is suppressed to a low temperature, the excess fuel does not grow into soot and therefore soot is not produced. Further, at this time, only an extremely small amount of NOx is produced. On the other hand, when the mean air fuel ratio is lean or when the air fuel ratio is the stoichiometric air fuel ratio, a small amount of soot is produced if the combustion temperature becomes higher, but in the present invention, the combustion temperature is suppressed to a low temperature, so no soot at all is produced. Further, only an extremely small amount of NOx is produced.

In this way, in the engine low load operating region Z1, regardless of the air fuel ratio, that is, whether the air fuel ratio is rich or the stoichiometric air fuel ratio or the mean air fuel ratio is lean, no soot is produced and the amount of NOx produced becomes extremely small. Therefore, considering the improvement of the fuel efficiency, it may be said to be preferable to make the mean air fuel ratio lean.

It is however only possible to suppress the temperature of the fuel and the gas surrounding it at the time of combustion in the combustion chamber to less than the temperature where the growth of the hydrocarbons is stopped midway at the time of a relatively low engine load where the amount of heat generated by the combustion is small. Accordingly, in the present invention, when the engine load is relatively low, the temperature of the fuel and the gas surrounding it is suppressed to less than the temperature where the growth of the hydrocarbons stops midway and first combustion, that is, low temperature combustion, is performed. When the engine load is relatively high, second combustion, that is, the conventionally normally performed combustion, is performed. Note that the first combustion, that is, the low temperature combustion, as clear from the explanation up to here, means combustion where the amount of inert gas in the combustion chamber is larger than the amount of inert gas where the amount of production of the soot peaks and where almost no soot is produced, while the second combustion, that is, the conventionally normally performed combustion, means combustion where the amount of inert gas in the combustion chamber is smaller than the amount of inert gas where the amount of production of soot peaks.

Figure 7:
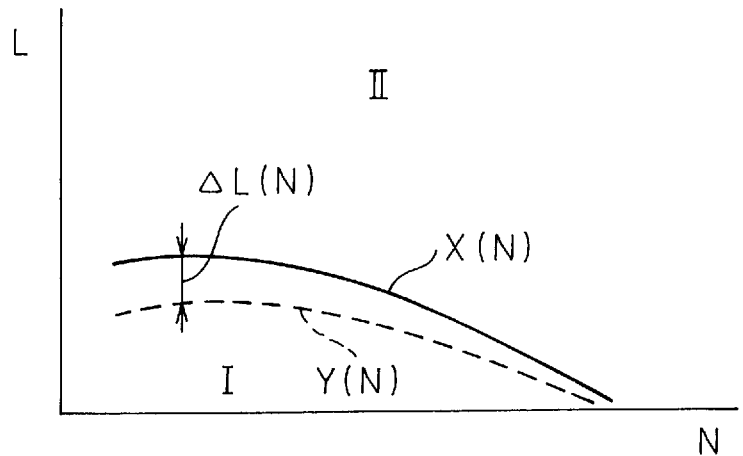
FIG. 7 is a view of a first operating region I and a second operating region II.

FIG. 7 shows a first operating region I where the first combustion, that is, the low temperature combustion, is performed and a second operating region II where the second combustion, that is, the combustion by the conventional combustion method, is performed. Note that in FIG. 7, the abscissa L shows the amount of depression of the accelerator pedal 40, that is, the required load, and the ordinate N shows the engine rotational speed. Further, in FIG. 7, X(N) shows a first boundary between the first operating region I and the second operating region II, and Y(N) shows a second boundary between the first operating region I and the second operating region II. The change of operating regions from the first operating region I to the second operating region II is judged based on the first boundary X(N), while the change of operating regions from the second operating region II to the first operating region I is judged based on the second boundary Y(N).

That is, when low temperature combustion is being performed when the engine is operating in the first operating region I, if the required load L exceeds the first boundary X(N), which is a function of the engine rotational speed N, it is judged that the operating region has shifted to the second operating region II and second combustion, that is, combustion by the conventional method of combustion, is performed. Next, when the required load L becomes lower than the second boundary Y(N), which is a function of the engine rotational speed N, it is judged that the operating region has shifted to the first operating region I and first combustion, that is, low temperature combustion, is again performed.

Figure 8:
FIG. 8 is a view of the relationship between $\Delta L(N)$ and the engine rotational speed N.

Note that in this embodiment of the present invention, the second boundary Y(N) is made the low load side from the first boundary X(N) by exactly $\Delta L(N)$. As shown in FIG. 7 and FIG. 8, $\Delta L(N)$ is a function of the engine rotational speed N. $\Delta L(N)$ becomes smaller the higher the engine rotational speed N.

When low temperature combustion is being performed when the engine is operating in the first operating region I, almost no soot is produced, but instead the unburnt hydrocarbons are exhausted from the combustion chamber 5 in the form of a soot precursor or a sate before that. At this time, if the catalyst 19 having the oxidation function is activated, the unburnt hydrocarbons exhausted from the combustion chamber 5 may be oxidized well by the catalyst 19. When the catalyst 19 is not activated at this time, however, the unburnt hydrocarbons cannot be oxidized by the catalyst 19 and therefore a large amount of unburnt hydrocarbons are exhausted into the atmosphere. Accordingly, in the present invention, even when the engine operating state is the first operating region where the first combustion, that is, low temperature combustion, can be performed, if the catalyst 19 is not activated, the first combustion is not performed, but the second combustion, that is, the combustion by the conventional method of combustion, is performed.

As the catalyst 19, an oxidation catalyst, three-way catalyst, or NOx absorbent may be used. An NOx absorbent has the function of absorbing the NOx when the mean air-fuel ratio in the combustion chamber 5 is lean and releasing the NOx when the mean air-fuel ratio in the combustion chamber 5 becomes rich.

The NOx absorbent is for example comprised of alumina as a carrier and, on the carrier, for example, at least one of potassium K, sodium Na, lithium Li, cesium Cs, and other alkali metals, barium Ba, calcium Ca, and other alkali earths, lanthanum La, yttrium Y, and other rare earths plus platinum Pt or another precious metal is carried.

The oxidation catalyst, of course, and also the three-way catalyst and NOx absorbent have an oxidation function, therefore the three-way catalyst and NOx absorbent can be used as the catalyst 19 as explained above.

The catalyst 19 is activated when the temperature of the catalyst 19 exceeds a certain predetermined temperature. The temperature at which the catalyst 19 is activated differs depending on the type of the catalyst 19. The activation temperature of a typical oxidation catalyst is about 350° C. The temperature of the exhaust gas passing through the catalyst 19 is lower than the temperature of the catalyst 19 by exactly a slight predetermined temperature, therefore the temperature of the exhaust gas passing through the catalyst 19 represents the temperature of the catalyst 19. Accordingly, in the embodiment of the present invention, it is judged if the catalyst 19 has become activated from the temperature of the exhaust gas passing through the catalyst 19.

Figure 9:
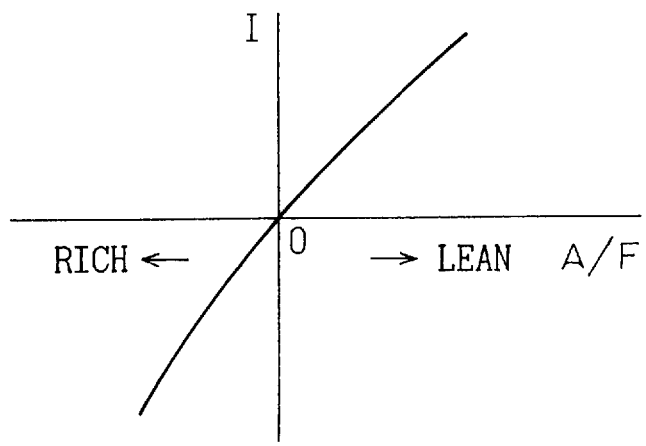
FIG. 9 is a view of the output of the air-fuel ratio sensor etc.

FIG. 9 shows the output of the air fuel ratio sensor 21. As shown in FIG. 9, the output current I of the air fuel ratio sensor 21 changes in accordance with the air fuel ratio A/F.

Therefore, it is possible to determine the air-fuel ratio from the output current I of the air fuel ratio sensor 21.

Next, a general explanation will be given of the control of the operation in the first operating region I and the second operating region II referring to FIG. 10 taking as an example a case where the catalyst 19 is activated.

Figure 10:
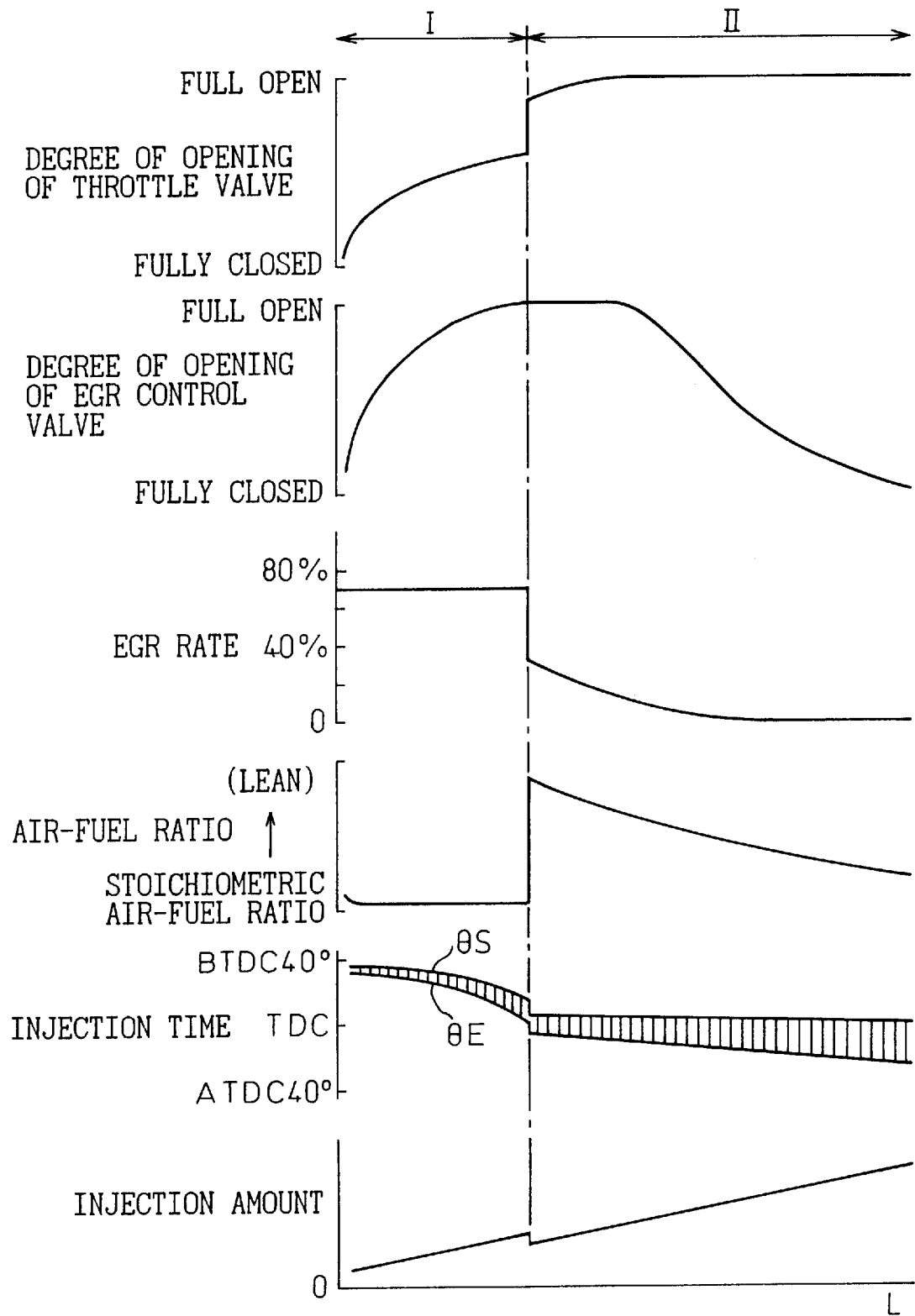
FIG. 10 is a view of the opening degree of a throttle valve etc.

FIG. 10 shows the opening degrees of the throttle valve 16, the opening degree of the EGR control valve 23, the EGR rate, the air-fuel ratio, the injection timing, and the amount of injection with respect to the required load L. As shown in FIG. 10, in the first operating region I with the low required load L, the opening degree of the throttle valve 16 is gradually increased from the fully closed state to the half opened state as the required load L becomes higher, while the opening degree of the EGR control valve 23 is gradually increased from the fully closed state to the fully opened state as the required load L becomes higher. Further, in the example shown in FIG. 10, in the first operating region I, the EGR rate is made about 70 percent and the air-fuel ratio is made a lean air-fuel ratio of 15 to 18.

In other words, in the first operating region, the opening degree of the throttle valve 16 and the opening degree of the EGR control valve 23 are controlled so that the EGR rate becomes about 70 percent and the air-fuel ratio becomes a lean air fuel ratio of 15 to 18. Note that at this time, the air-fuel ratio is controlled to the target air-fuel ratio by correcting the opening degree of the EGR control valve 23 based on the output signal of the air-fuel ratio sensor 21. Further, in the first operating region I, the fuel is injected before top dead center of the compression stroke TDC. In this case, the injection start timing θS becomes later the higher the required load L. The injection end timing θE also becomes later the later the injection start timing θS.

Note that, during idling operation, the throttle valve 16 is made to close to close to the fully closed state. At this time, the EGR control valve 23 is also made to close to close to the fully closed state. If the throttle valve 16 closes to close to the fully closed state, the pressure in the combustion chamber 5 at the start of compression will become low, so the compression pressure will become small. If the compression pressure becomes small, the amount of compression work by the piston 4 becomes small, so the vibration of the engine body 1 becomes smaller. That is, during idling operation, the throttle valve 16 can be closed to close to the fully closed state to suppress vibration in the engine body 1.

When the engine is operating in the first operating region I, almost no soot or NOx is produced and hydrocarbons in the form of a soot precursor or its previous state contained in the exhaust gas can be oxidized by the catalyst 19.

On the other hand, if the engine operating state changes from the first operating region I to the second operating region II, the opening degree of the throttle valve 16 is increased in a step-like manner from the half opened state to the fully opened state. At this time, in the example shown in FIG. 10, the EGR rate is reduced in a step-like manner from about 70 percent to less than 40 percent and the air-fuel ratio is increased in a step-like manner. That is, since the EGR rate jumps over the range of EGR rates (FIG. 2) where a large amount of smoke is produced, there is no longer a large amount of smoke produced when the engine operating state changes from the first operating region I to the second operating region II.

In the second operating region II, the conventionally performed combustion is performed. In this combustion method, some soot and NOx are produced, but the heat efficiency is higher than with the low temperature combustion, so if the engine operating state changes from the first operating region I to the second operating region II, the amount of injection is reduced in a step-like manner as shown in FIG. 10.

In the second operating region II, the throttle valve 16 is held in the fully opened state except in portions and the opening degree of the EGR control valve 23 is gradually made smaller then higher the required load L. Therefore, in the operating region II, the EGR rate becomes lower the higher the required load L and the air-fuel ratio becomes smaller the higher then required load L. Even if the required load L becomes high, however, the air-fuel ratio is made a lean air-fuel ratio. Further, in the second operating region II, the injection start timing θS is made close to top dead center of the compression stroke TDC.

The range of the first operating region I where low temperature combustion is possible changes according to the temperature of the gas in the combustion chamber 5 at the start of compression and the temperature of the surface of the inside wall of the cylinder. That is, if the required load becomes high and the amount of heat generated due to the combustion increases, the temperature of the fuel and its surrounding gas at the time of combustion becomes high and therefore low temperature combustion can no longer be performed. On the other hand, when the temperature of the gas TG in the combustion chamber 5 at the start of compression becomes low, the temperature of the gas in the combustion chamber 5 directly before when the combustion was started becomes lower, so the temperature of the fuel and its surrounding gas at the time of combustion becomes low. Accordingly, if the temperature of the gas TG in the combustion chamber 5 at the start of compression becomes low, even if the amount of heat generated by the combustion increases, that is, even if the required load becomes high, the temperature of the fuel and its surrounding gas at the time of combustion does not become high and therefore low temperature combustion is performed. In other words, the lower the temperature of the gas TG in the combustion chamber 5 at the start of compression, the more the first operating region I where low temperature combustion can be performed expands to the high load side.

Further, the smaller the temperature difference (TW-TG) between the temperature TW of the cylinder inner wall and the temperature of the gas TG in the combustion chamber 5 at the start of compression, the more the amount of heat escaping through the cylinder inner wall during the compression stroke. Therefore, the smaller this temperature difference (TW-TG), the smaller the amount of rise of temperature of the gas in the combustion chamber 5 during the compression stroke and therefore the lower the temperature of the fuel and its surrounding gas at the time of combustion. Accordingly, the smaller the temperature difference (TW-TG), the more the first operating region I where low temperature combustion can be performed expands to the high load side.

Figure 11:
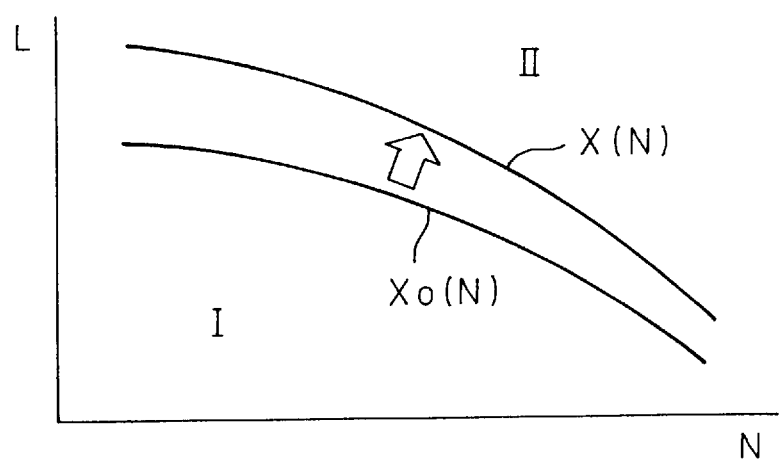
FIG. 11 is a view explaining the method of control of a first boundary X(N)

In this embodiment according to the present invention, when the temperature of the gas TG in the combustion chamber 5 becomes low, as shown in FIG. 11, the first boundary is made to shift from $X_0(N)$ to $X(N)$. When the temperature difference (TW-TG) becomes small, as shown in FIG. 11, the first boundary is made to shift from $X_0(N)$ to $X(N)$. Note that here, $X_0(N)$ shows the reference first boundary. The reference first boundary $X_0(N)$ is a function of the engine rotational speed N. $X(N)$ is calculated using this $X0(N)$ based on the following equations:

$$X(N) = X_0(N) + K(T) \cdot K(N)$$

$$K(T)=K(T)_1+K(T)_2$$

Figure 12A:
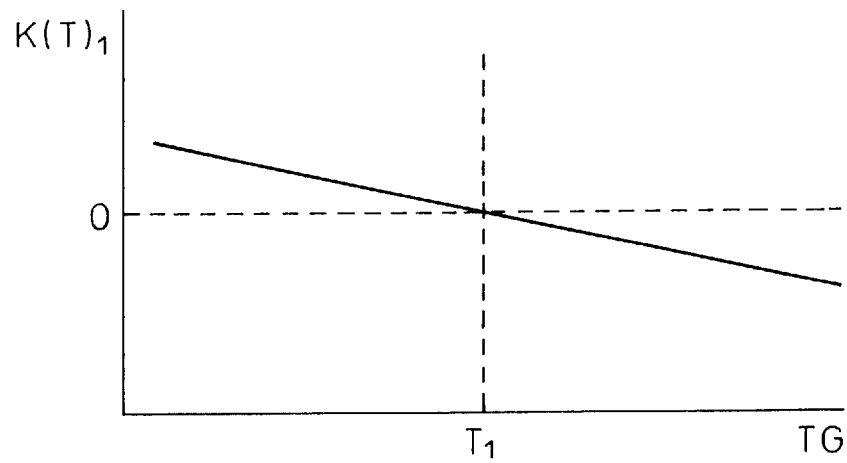
FIGS. 12A to 12C are views of $K(T)_1$, $K(T)_2$, and K(N)
Figure 12B:
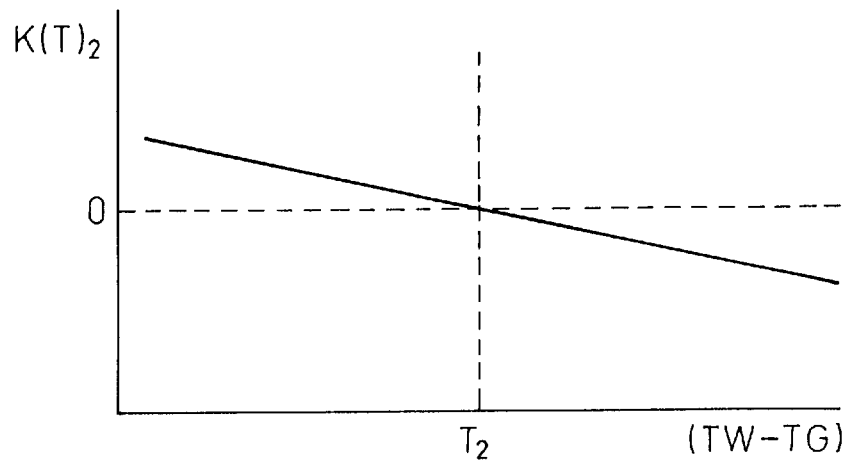

Here, $K(T)_1$, as shown in FIG. 12A, is a function of the temperature of the gas TG in the combustion chamber 5 at the start of compression. The value of $K(T)_1$ becomes larger the lower the temperature of the gas TG in the combustion chamber 5 at the start of compression. Further, $K(T)_2$ is a function of the temperature difference (TW-TG) as shown in FIG. 12B. The value of $K(T)_2$ becomes larger the smaller the temperature difference (TW-TG). Note that in FIG. 12A and FIG. 12B, $T_1$ is the reference temperature and $T_2$ is the reference temperature difference. When TG=$T_1$ and (TW-TG)=$T_2$, the first boundary becomes $X_0(N)$ of FIG. 11.

Figure 12C:
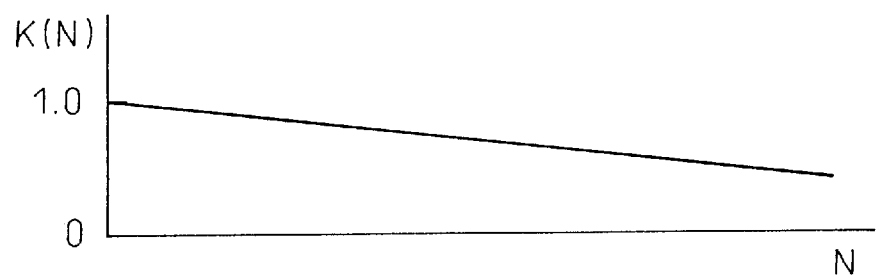

On the other hand, K(N) is a function of the engine rotational speed N as shown in FIG. 12C. The value of K(N) becomes smaller the higher the engine rotational speed N. That is, when the temperature of the gas TG in the combustion chamber 5 at the start of compression becomes lower than the reference temperature $T_1$, the lower the temperature of the gas TG in the combustion chamber 5 at the start of compression, the more the first boundary X(N) shifts to the high load side with respect to $X_0(N)$. When the temperature difference (TW-TG) becomes lower than the reference temperature difference $T_2$, the smaller the temperature difference (TW-TG), the more the first boundary X(N) shifts to the high load side with respect to $X_0(N)$. Further, the amount of shift of X(N) with respect to $X_0(N)$ becomes smaller the higher the engine rotational speed N.

Figure 13A:
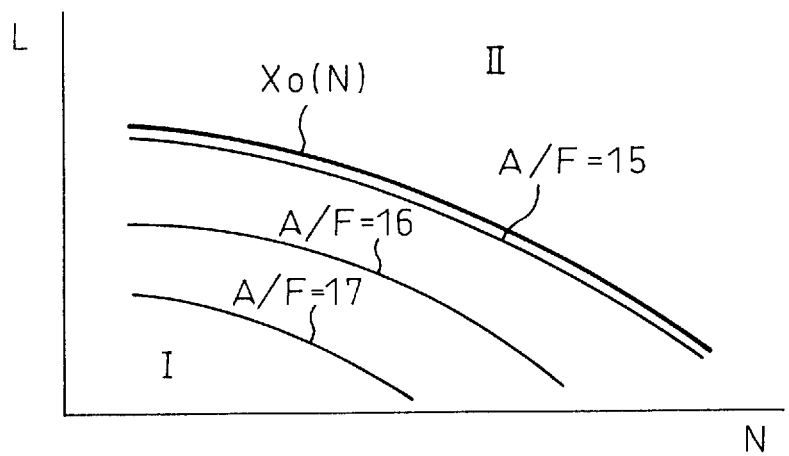
FIGS. 13A and 13B are views of the air-fuel ratio in the first operating region I.

FIG. 13A shows the air-fuel ratio A/F in the first operating region I when the first boundary is the reference first boundary $X_0(N)$. In FIG. 13A, the curves shown by A/F=15, A/F=16, and A/F=17 respectively show the cases where the air-fuel ratio is 15, 16, and 17. The air-fuel ratios between the curves are determined by proportional distribution. As shown in FIG. 13A, in the first operating region, the air-fuel ratio becomes lean. Further, in the first operating region I, the air-fuel ratio A/F is made leaner the lower the required load L.

That is, the lower the required load L, the smaller the amount of heat generated by the combustion. Accordingly, the lower the required load L, the more low temperature combustion can be performed even if the EGR rate is lowered. If the EGR rate is lowered, the air-fuel ratio becomes larger. Therefore, as shown in FIG. 13A, the air-fuel ratio A/F is made larger as the required load L becomes lower. The larger the air-fuel ratio A/F becomes, the more improved the fuel efficiency. Therefore to make the air-fuel ratio as lean as possible, in the embodiment according to the present invention, the air-fuel ratio A/F is made larger the lower the required load L becomes.

Figure 13B:
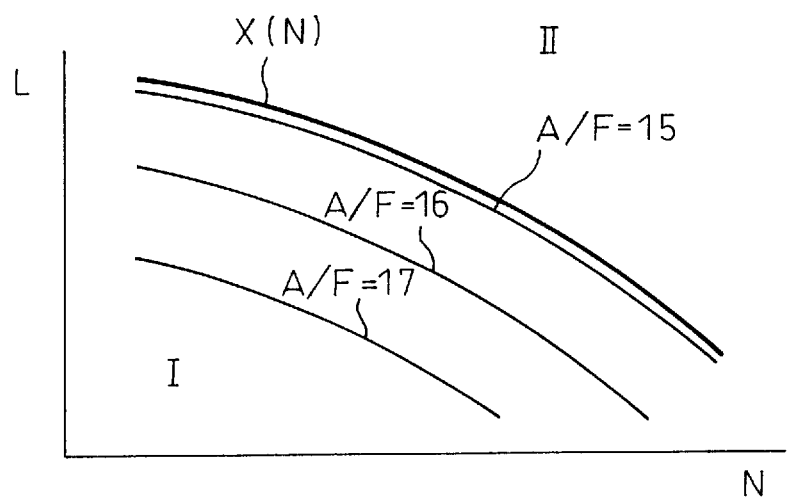

FIG. 13B shows the air-fuel ratio A/F in the first operating region I when the first boundary is X(N) shown in FIG. 11. If comparing FIG. 13A and FIG. 13B, when the first boundary X(N) shifts to the high load side with respect to $X_0(N)$, the curves of A/F=15, A/F=16, and A/F=17 showing the air-fuel ratios also shift to the high load side following the same. Therefore, it is learned that when the first boundary X(N) shifts to the high load side with respect to $X_0(N)$, the air-fuel ratio A/F at the same required load L and the same engine rotational speed N becomes larger. That is, if the first operating region I is made to expand to the high load side, not only is the operating region where almost no soot and NOx are produced expanded, but also the fuel efficiency is improved.

Figure 14A:
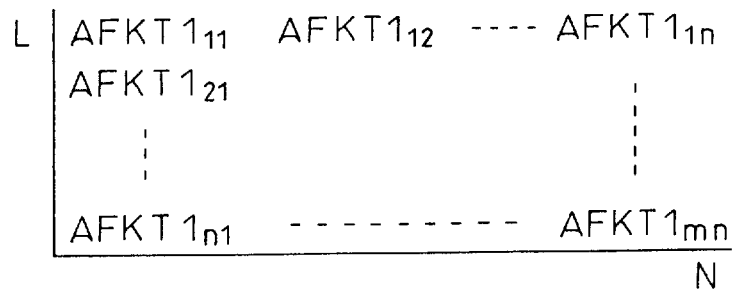
FIGS. 14A to 14D are views of a map of a target air-fuel ratio.
Figure 14B:
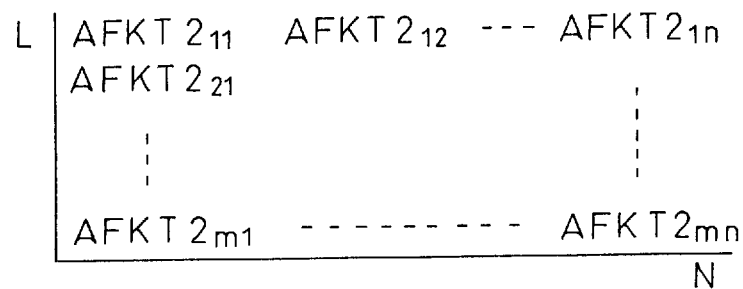
Figure 14C:
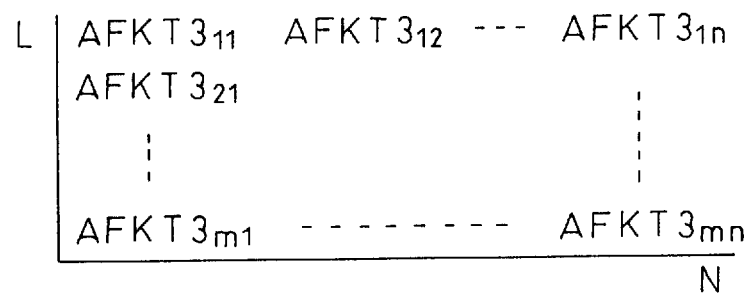
Figure 14D:
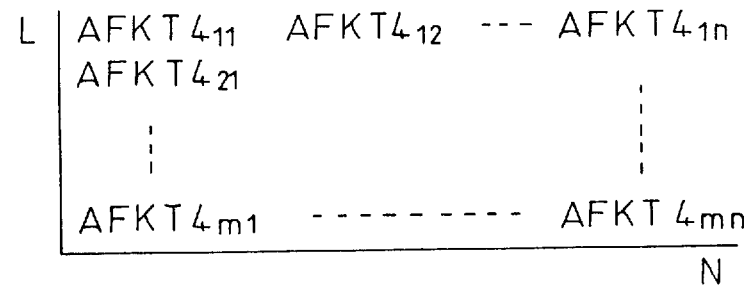

In this embodiment according to the present invention, the target air-fuel ratios in the first operating region I for various different first boundaries X(N), that is, the target air-fuel ratios in the first operating region I for various values of K(T), are stored in advance in the ROM 32 in the form of a map as a function of the required load L and the engine rotational speed N as shown in FIG. 14A to FIG. 14D. That is, FIG. 14A shows the target air-fuel ratio AFKT1 when the value of K(T) is KT1, FIG. 14B shows the target air-fuel ratio AFKT2 when the value of K(T) is KT2, FIG. 14C shows the target air-fuel ratio AFKT3 when the value of K(T) is KT3, and FIG. 14D shows the target air-fuel ratio AFKT4 when the value of K(T) is KT4.

On the other hand, the target opening degrees of the throttle valve 16 required for making the air-fuel ratio the target air-fuel ratios AFKT1, AFKT2, AKFT3, and AFKT4 are stored in advance in the ROM 32 in the form of a map as a function of the required load L and the engine rotational speed N as shown in FIG. 15A to FIG. 15D. Further, the target basic opening degrees of the EGR control valve 23 required for making the air-fuel ratio the target air-fuel ratios AFKT1, AFKT2, AKFT3, and AFKT4 are stored in advance in the ROM 32 in the form of a map as a function of the required load L and the engine rotational speed N as shown in FIG. 16A to FIG. 16D.

Figure 15A:
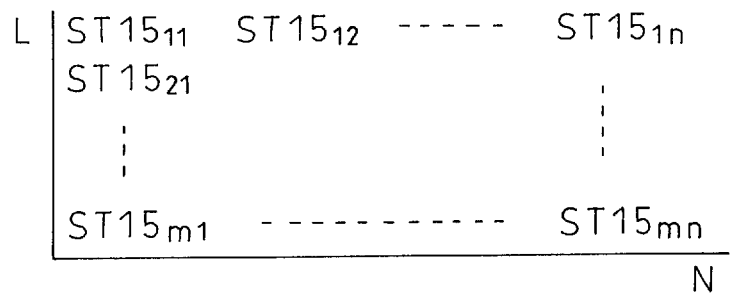
FIGS. 15A to 15D are views of a map of a target opening degree of a throttle valve.
Figure 16A:
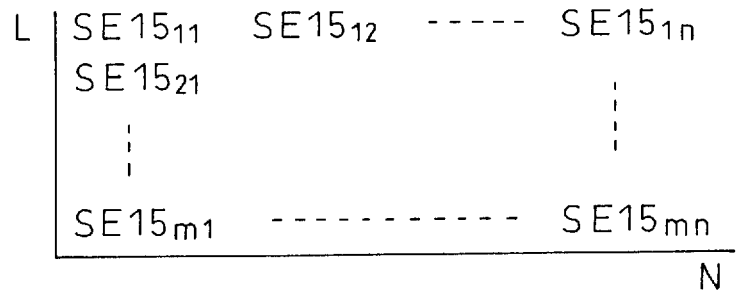
FIGS. 16A to 16D are views of a target basic opening degree of an EGR control valve.

That is, FIG. 15A shows the target opening degree ST15 of the throttle valve 16 when the air-fuel ratio is 15, while FIG. 16A shows the target basic opening degree SE15 of the EGR control valve 23 when the air-fuel ratio is 15.

Figure 15B:
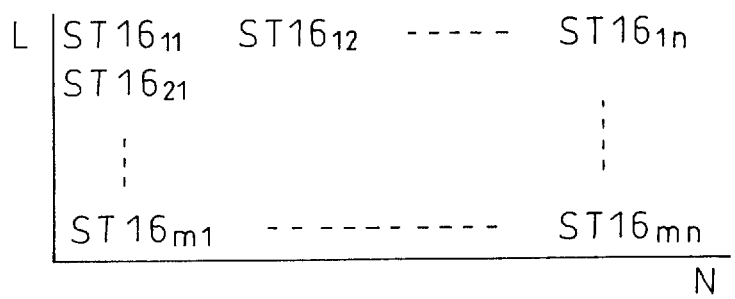
Figure 16B:
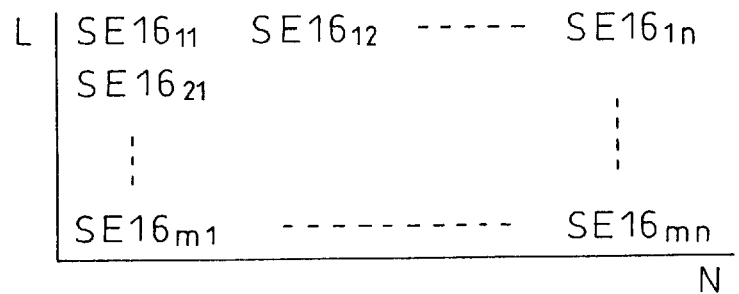

Further, FIG. 15B shows the target opening degree ST16 of the throttle valve 16 when the air-fuel ratio is 16, while FIG. 16B shows the target basic opening degree SE16 of the EGR control valve 23 when the air-fuel ratio is 16.

Figure 15C:
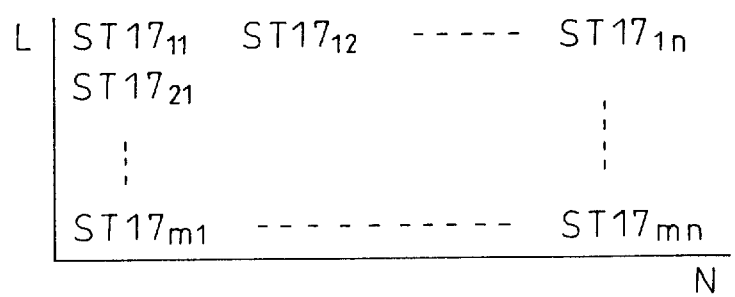
Figure 16C:
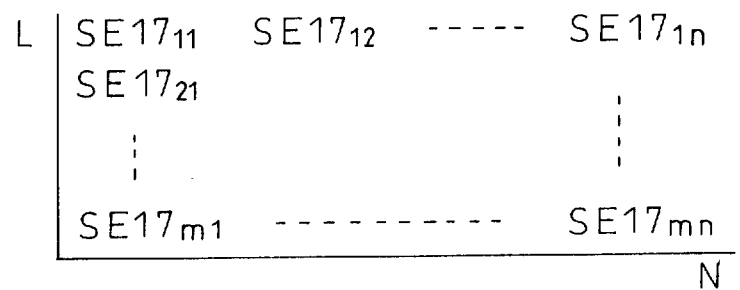

Further, FIG. 15C shows the target opening degree ST17 of the throttle valve 16 when the air-fuel ratio is 17, while FIG. 16C shows the target basic opening degree SE17 of the EGR control valve 23 when the air-fuel ratio is 17.

Figure 15D:
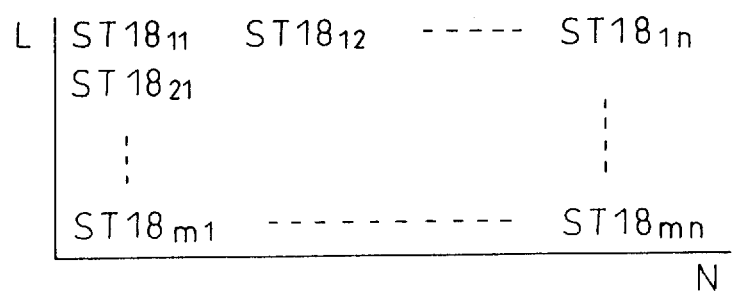
Figure 16D:
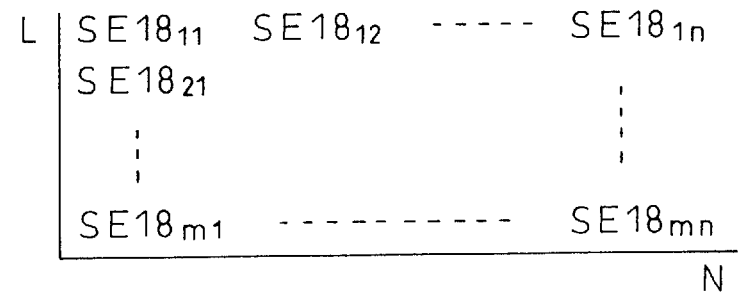

Further, FIG. 15D shows the target opening degree ST18 of the throttle valve 16 when the air-fuel ratio is 18, while FIG. 16D shows the target basic opening degree SE18 of the EGR control valve 23 when the air-fuel ratio is 18.

Figure 17:
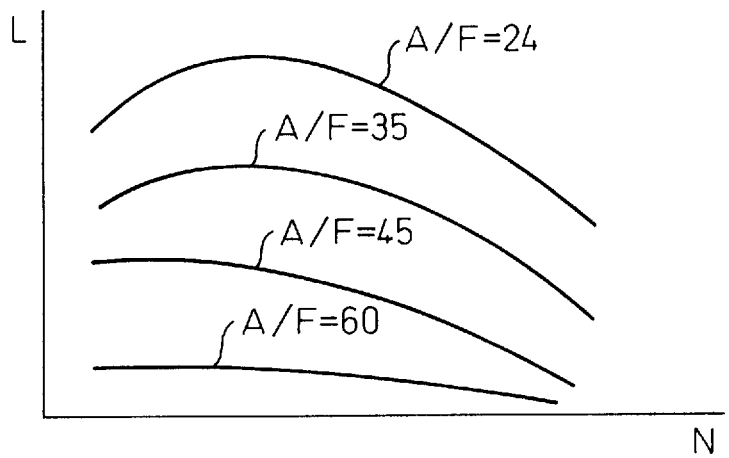
FIG. 17 is a view of an air-fuel ratio in a second combustion etc.
Figure 18A:
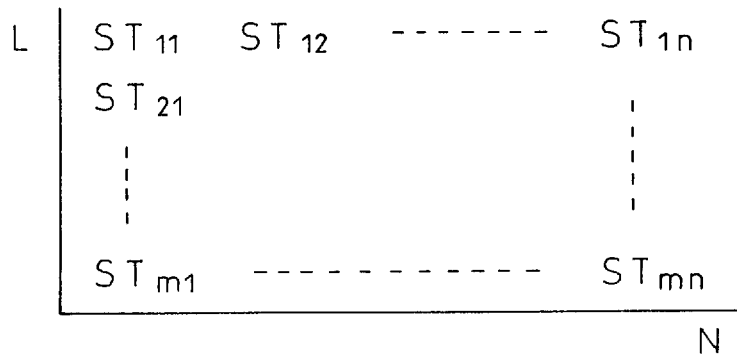
FIGS. 18A and 18B are views of a target opening degree of a throttle valve etc.
Figure 18B:
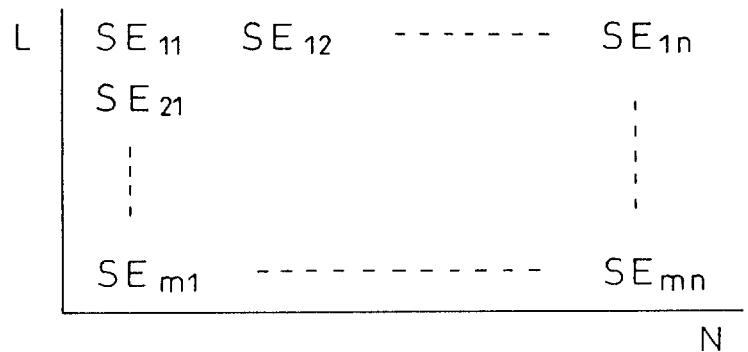

FIG. 17 shows the target air-fuel ratio at the time of second combustion, that is, normal combustion by the conventional combustion method. Note that in FIG. 17, the curves indicated by A/F=24, A/F=35, A/F=45, and A/F=60 respectively show the target air-fuel ratios 24, 35, 45, and 60. The target opening degrees ST of the throttle valve 16 required for making the air-fuel ratio these target air-fuel ratios are stored in advance in the ROM 32 in the form of a map as a function of the required load L and the engine rotational speed N as shown in FIG. 18A. The target opening degrees SE of the EGR control valve 23 required for making the air-fuel ratio these target air-fuel ratios are stored in advance in the ROM 32 in the form of a map as a function of the required load L and the engine rotational speed N as shown in FIG. 18B.

When the engine is operating in the second operating region II, the air-fuel ratio is made the target air-fuel ratio shown in FIG. 17. Further, even when the engine is operating in the first operating region I1, the air-fuel ratio is made the target air-fuel ratio shown in FIG. 17 when the second combustion is to performed.

As explained up to here, when the engine is operating in the first operating region I and the catalyst 19 is activated, first combustion, that is, low temperature combustion, is performed. Sometimes however even if the engine is operating in the first operating region I and the catalyst 19 is activated, good low temperature combustion is not possible due to some reason or another. Therefore, in the first embodiment of the present invention, when the catalyst 19 is activated, when the engine is operating in the first operating region I, the opening degree of the throttle valve 16 and the opening degree of the EGR control valve 23 for the low temperature combustion are respectively made the target opening degree ST shown in FIGS. 15A to 15D and the target basic opening degree SE shown in FIGS. 16A to 16D. When good low temperature combustion is not possible at this time, the second combustion is switched to.

In the first embodiment of the present invention, whether or not good low temperature combustion is being performed is judged based on the pressure in the combustion chamber 5 detected by the combustion pressure sensor 46. That is, when good low temperature combustion is being performed, as shown in FIG. 19, the combustion pressure changes gently. More specifically, the combustion pressure peaks once at the top dead center TDC as shown by $P_0$, then again peaks after the top dead center TDC as shown by $P_1$. The peak pressure $P_1$ occurs due to the combustion pressure. When good low temperature combustion is being performed, the amount of rise in the peak pressure $P_1$ with respect to the peak pressure $P_0$, that is, the differential pressure $\Delta P$ (=$P_1$-$P_0$) between the peak pressure $P_0$ and the peak pressure $P_1$, becomes relatively small.

As opposed to this, for example, when a region of a high density of fuel particles is formed locally and as a result the amount of rise in pressure after ignition becomes larger, the combustion temperature will become higher. At this time, low temperature combustion is no longer performed and therefore a large amount of soot is produced. Therefore, in the embodiment of the present invention, when the differential pressure $\Delta P$ (=$P_1$-$P_0$) exceeds a predetermined upper limit $\alpha$, the air-fuel ratio is made smaller or the injection timing is delayed so that the differential pressure $\Delta P$ becomes smaller. When the differential pressure $\Delta P$ does not become smaller than the set value $\alpha$ even so, low temperature combustion, that is, the first combustion, is switched to the second combustion. Note that if the air-fuel ratio is made smaller, the rise in pressure falls and the combustion temperature becomes lower since the concentration of oxygen around the fuel particles becomes lower.

Figure 20A:
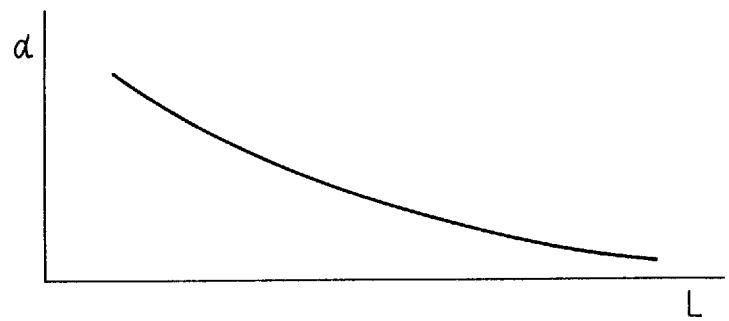
FIGS. 20A to 20C are views of an upper limit α.
Figure 20B:
Figure 20C:
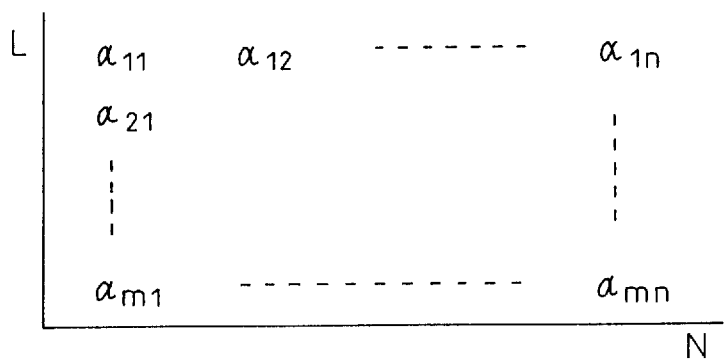

As shown in FIG. 20A, the upper limit $\alpha$ becomes smaller the larger the required load L. As shown in FIG. 20B, the upper limit $\alpha$ becomes smaller the higher the engine rotational speed N as well. This upper limit $\alpha$, as shown in FIG. 20C, is stored as a function of the required load L and the engine rotational speed N in the form of a map in advance in the ROM 32.

Further, when good low temperature combustion is not being performed and defective combustion occurs, the peak pressure $P_1$ becomes lower than the peak pressure $P_0$. Therefore, in the first embodiment of the present invention, when the differential pressure $\Delta P$ (=$P_1$-$P_0$) becomes a negative value, the air-fuel ratio is made larger or the injection timing is made earlier to realize good low temperature combustion. When the differential pressure $\Delta P$ does not become more than 0 even with this, low temperature combustion, that is, the first combustion, is switched to the second combustion.

Figure 21:
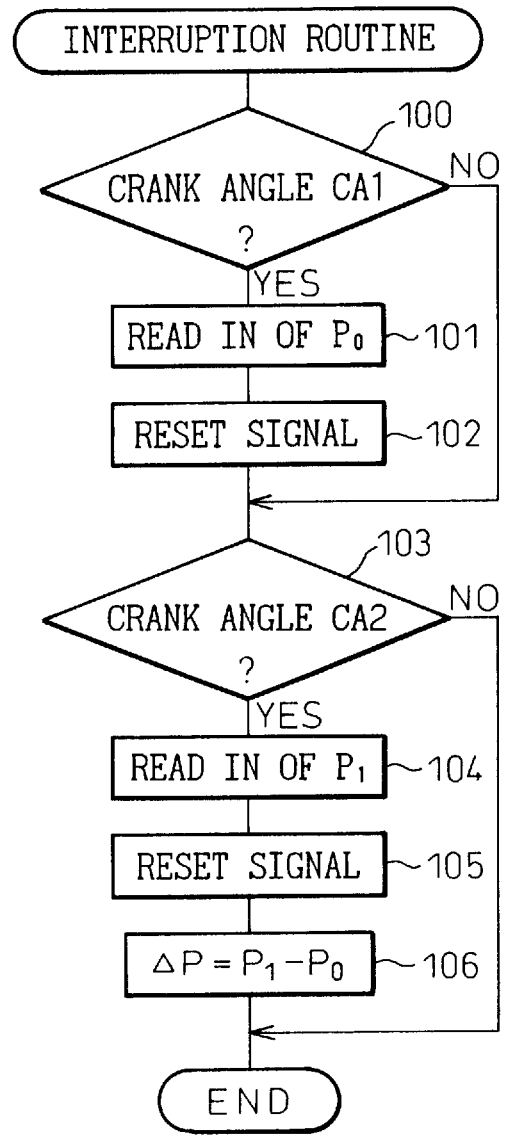
FIG. 21 is a view of a crank angle interruption routine.

Next, the method of detection of the differential pressure $\Delta P$ will be explained with reference to FIG. 19 and FIG. 21. FIG. 21 shows a crank angle interruption routine. First, at step 100, it is judged if the current crank angle is CA1 (FIG. 19) or not. When the crank angle is CA1, the routine proceeds to step 101, where the output voltage of the peak hold circuit 47 is read. At this time, the output voltage of the peak hold circuit 47 indicates the peak pressure $P_0$, therefore at step 101, the peak pressure $P_0$ is read. Next, at step 102, the reset signal is input to the reset input terminal R of the peak hold circuit 47, whereby the peak hold circuit 47 is reset.

Next, at step 103, it is judged if the current crank angle is CA2 (FIG. 19) or not. When the crank angle is CA2, the routine proceeds to step 104, where the output voltage of the peak hold circuit 47 is read. At this time, the output voltage of the peak hold circuit 47 indicates the peak pressure $P_1$, therefore at step 104, the peak pressure $P_1$ is read. Next, at step 105, the reset signal is input to the reset input terminal R of the peak hold circuit 47, whereby the peak hold circuit 47 is reset. Next, at step 106, the differential pressure $\Delta P$ (=$P_1$-$P_0$) between the peak pressure $P_0$ and the peak pressure $P_1$ is calculated.

Figure 22:
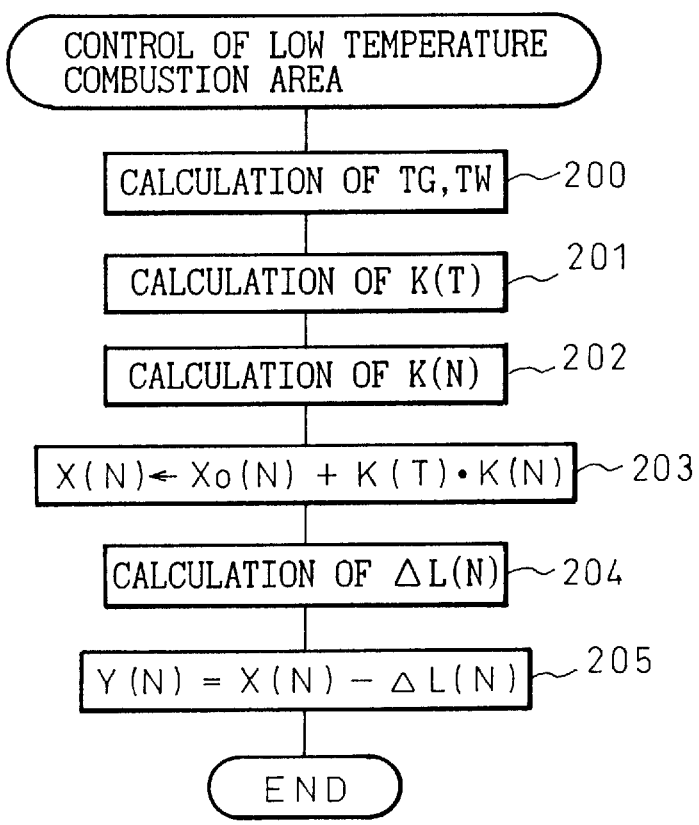
FIG. 22 is a flow chart of the control of a low temperature combustion region.

FIG. 22 shows the routine for control of the low temperature combustion region, that is, the first operating region I.

Referring to FIG. 22, first, at step 200, the temperature of the gas TG inside the combustion chamber 5 at the start of compression and the temperature TW of the cylinder inner wall are calculated. In this embodiment, the temperature of the mixed gas of the suction air and the EGR gas detected by the temperature sensor 43 is made the temperature of the gas TG in the combustion chamber 5 at the start of compression, while the temperature of the engine cooling water detected by the temperature detector 29 is made the temperature TW of the cylinder inner wall. Next, at step 201, $K(T)_1$ is found from the relationship shown in FIG. 12A, $K(T)_2$ is found from the relationship shown in FIG. 12B, and these $K(T)_1$ and $K(T)_2$ are added to calculate $K(T)$ (=$K(T)_1$+$K(T)_2$).

Next, at step 202, $K(N)$ is calculated from the relationship shown in FIG. 12C based on the engine rotational speed N. Next, at step 203, the value of the first boundary $X_0(N)$ stored in advance is used to calculate the value of the first boundary $X(N)$ based on the following equation:

$$X(N)=X_0(N)+K(T) \cdot K(N)$$

Next, at step 204, $\Delta L(N)$ is calculated from the relationship shown in FIG. 8 based on the engine rotational speed N. Next, at step 205, $\Delta L(N)$ is subtracted from $X(N)$ to calculate the value of the second boundary $Y(N)$ (=$X(N)$-$\Delta L(N)$).

Next, an explanation will be given of the control of the operation with reference to FIG. 23 to FIG. 24. Note that in this embodiment, when low temperature combustion is to be performed and the differential pressure $\Delta P$ (=$P_1$-$P_0$) exceeds the upper limit $\alpha$, the air-fuel ratio is made smaller. When the differential pressure $\Delta P$ becomes a negative value, the air-fuel ratio is made larger. That is, the differential pressure $\Delta P$ is held in a predetermined range where it is larger than zero and smaller than the upper limit $\alpha$. Further, when the differential pressure $\Delta P$ does not become lower than the upper limit $\alpha$ even when the air-fuel ratio is made small, the second combustion is switched to. Further, when the differential pressure $\Delta P$ does not become higher than zero even when the air-fuel ratio is made large, the second combustion is switched to.

Figure 23:
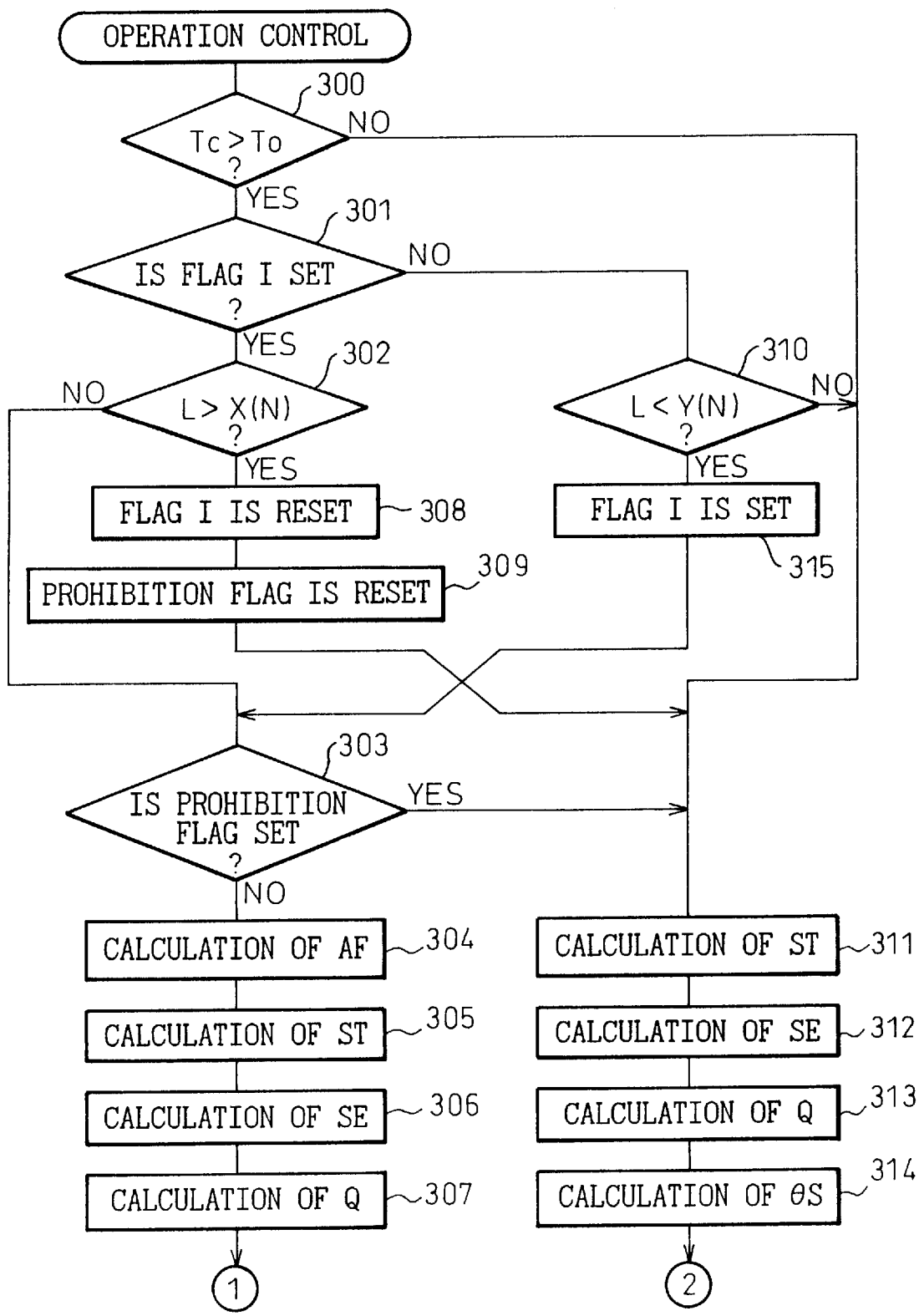
FIGS. 23 and 24 are flow charts of the control of engine operation.
Figure 24:
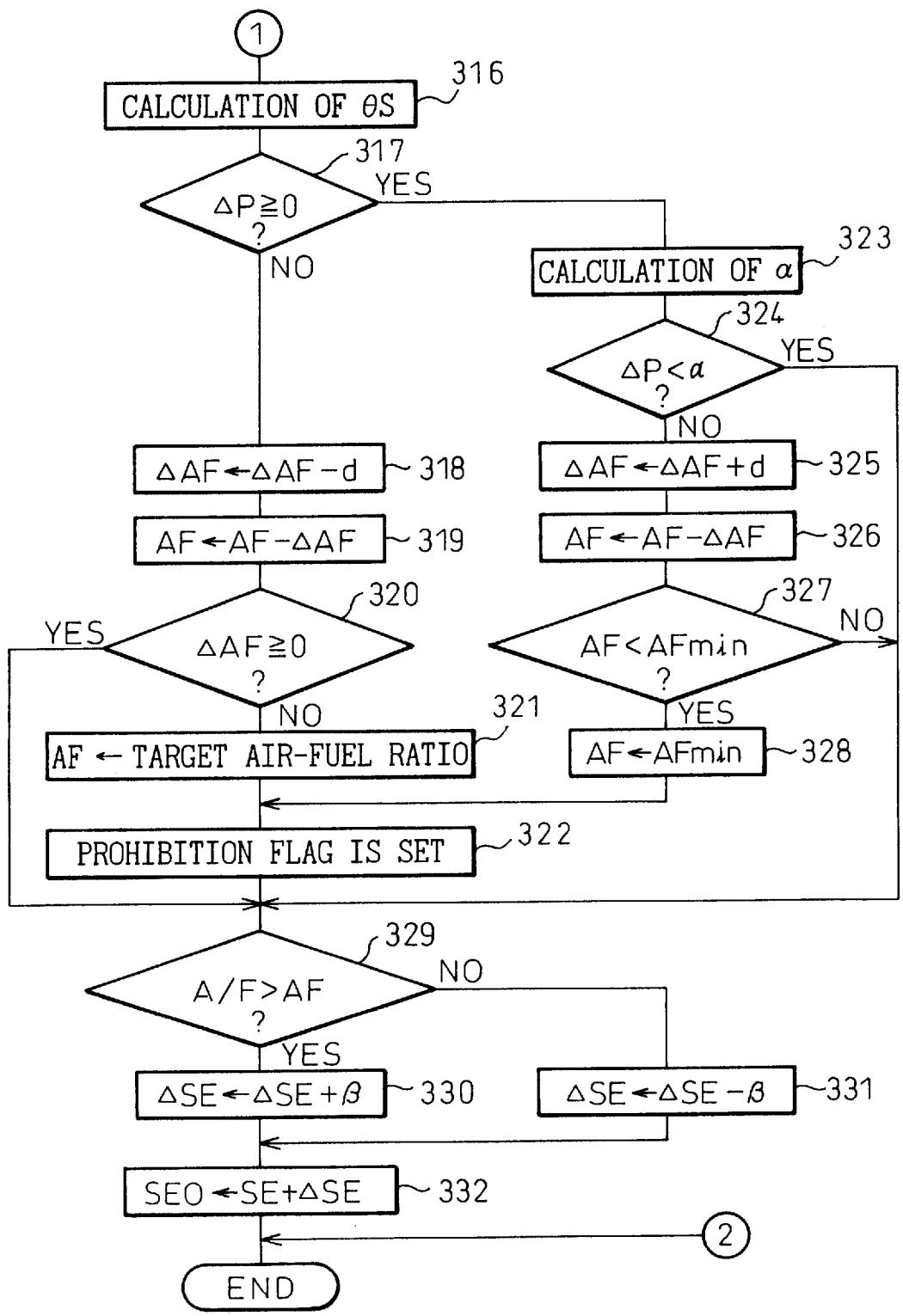

Referring to FIG. 23 and FIG. 24, first, at step 300, it is judged if the temperature Tc of the exhaust gas passing through the catalyst 19 is higher than a predetermined $T_0$, that is, if the catalyst 19 has been activated or not, based on the output signal of the temperature sensor 45. When Tc$\leq T_0$, that is, when the catalyst 19 has not been activated, the routine proceeds to step 311, where second combustion, that is, combustion by the conventional combustion method, is performed.

That is, at step 311, the target opening degree ST of the throttle valve 16 is calculated from the map shown in FIG. 18A, then at step 312 the target opening degree SE of the EGR control valve 23 is calculated from the map shown in FIG. 18B. Next, at step 313, the injection amount Q is calculated, then at step 314, the injection start timing θS is calculated.

When it is judged at step 300 that $Tc>T_0$, that is, when the catalyst 19 is activated, the routine proceeds to step 301, where it is judged if a flag I showing that the engine operating region is the first operating region I is set or not. When the flag I is set, that is, when the engine operating region is the first operating region I, the routine proceeds to step 302, where it is judged if the required load L has become larger than the first boundary X(N) or not. When L≦X(N), the routine proceeds to step 303.

At step 303, it is judged if a prohibit flag indicating that first combustion, that is, low temperature combustion, should be prohibited has been set or not. When the prohibit flag has not been set, that is, when low temperature combustion is to be performed, the routine proceeds to step 304, where the opening degree of the throttle valve 16 and the opening degree of the EGR control valve 23 for the low temperature combustion are controlled.

That is, at step 304, the two maps corresponding to K(T) out of the maps shown from FIGS. 14A to 14D are used to calculate the target air-fuel ratio AF by proportional distribution. Next, at step 305, the two maps corresponding to the target air-fuel ratio AF out of the maps shown from FIGS. 15A to 15D are used to calculate the target opening degree ST of the throttle valve 16 by proportional distribution. The opening degree of the throttle valve 16 is controlled to the target opening degree ST. Next, at step 306, the two maps corresponding to the target air-fuel ratio AF out of the maps shown from FIGS. 16A to 16D are used to calculate the target basic opening degree SE of the EGR control valve 23 by proportional distribution. Next, at step 307, the injection amount Q is calculated, then, at step 316, the injection start timing θS is calculated. Next, the routine proceeds to step 317.

At step 317, it is judged if the differential pressure ΔP $(=P_1-P_0)$ is larger than zero or not. When ΔP≧0, the routine proceeds to step 323, where the upper limit α is calculated from the map shown in FIG. 20C. Next, at step 324, it is judged if the differential pressure ΔP is smaller than the upper limit α or not. When ΔP<α, the routine jumps to step 329. That is, when 0≦ΔP<α, the routine jumps to step 329.

At step 329, it is judged if the actual air-fuel ratio A/F detected by the air-fuel ratio sensor 21 is larger than the target air-fuel ratio AF or not. When A/F >AF, the routine proceeds to step 330, where a predetermined value β is added to the correction value ΔSE for the opening degree of the EGR control valve 23, then the routine proceeds to step 332. As opposed to this, when A/F≦AF, the routine proceeds to step 331, where the predetermined value β is subtracted from the correction value ΔSE, then the routine proceeds to step 332. At step 332, the correction value ΔSE is added to the target basic opening degree SE of the EGR control valve 23 to calculate the target opening degree SE0 of the EGR control valve 23. The opening degree of the EGR control valve 23 is controlled to this target opening degree SE0. That is, in this embodiment, the opening degree of the EGR control valve 23 is controlled to control the actual air-fuel ratio to the target air-fuel ratio AF. Of course, in this case, it is also possible to control the opening degree of the throttle valve 16 to control the actual air-fuel ratio to the target air-fuel ratio AF.

When the opening degree of the throttle valve 16 and the opening degree of the EGR control valve 23 are controlled for the low temperature combustion in this way, if the differential pressure ΔP is within the predetermined range (0≦ΔP<α), that is, if good low temperature combustion is being performed, the low temperature combustion is continued as it is. At this time, the actual air-fuel ratio is controlled to the target air-fuel ratio AF.

On the other hand, when it is judged at step 302 that L>X(N), the routine proceeds to step 308, where the flag I is reset, then the prohibit flag is reset at step 309. Next, the routine proceeds to step 311, where the second combustion, that is, the conventionally performed normal combustion, is performed.

On the other hand, when it is judged at step 301 that the flag I has been reset, that is, when the engine is operating in the second operating region II, the routine proceeds to step 310, where it is judged if the required load L has become smaller than the second boundary Y(N) or not. When L≧Y(N), the routine proceeds to step 311. As opposed to this, when L<Y(N), the routine proceeds to step 315, where the flag I is set. Next, the routine proceeds to step 303, where the opening degree of the throttle valve 16 and the opening degree of the EGR control valve 23 are controlled for low temperature combustion.

On the other hand, when it is judged at step 324 that ΔP≧α, the routine proceeds to step 325, where the predetermined value d is added to the correction value ΔAF of the target air-fuel ratio AF. Next, at step 326, the correction value ΔAF is subtracted from the target air-fuel ratio AF, whereby the air-fuel ratio is made smaller. Next, at step 327, it is judged if the air-fuel ratio AF has become smaller than a predetermined lower limit AFmin, for example, 15.0, or not. When AF≧AFmin, the routine jumps to step 329. As opposed to this, when AF<AFmin, the routine proceeds to step 328, where the air-fuel ratio AF is made the lower limit AFmin, then the routine proceeds to step 322, where the prohibit flag is set.

That is, when the opening degree of the throttle valve 16 and the opening degree of the EGR control valve 23 are controlled for low temperature combustion, if the differential pressure ΔP becomes larger than the upper limit α, the air-fuel ratio is gradually made smaller. At this time, if ΔP becomes lower than α, low temperature combustion is performed. As opposed to this, when ΔP≧α even when the air-fuel ratio AF becomes smaller to the lower limit AFmin, the prohibit flag is set. If the prohibit flag is set, the routine proceeds from step 303 to step 311, then the second combustion is switched to.

The prohibit flag is reset when it is judged at step 302 that L>X(N), that is, when the engine is operating in the second operating region II. Therefore, when the prohibit flag is set when the engine is operating in the first operating region I, the engine then changes to operate in the second operating region II and second combustion is continued until the first operating region is again switched to.

On the other hand, when it is judged at step 317 that the differential pressure ΔP has become negative, the routine proceeds to step 318, where the predetermined value d is subtracted from the correction value ΔAF. Next, at step 319, the correction value ΔAF is subtracted from the target air-fuel ratio AF, at which time the air-fuel ratio AF becomes larger. Next, at step 320, it is judged if the correction value ΔAF is larger than zero. When ΔAF≧0, the routine jumps to step 329. As opposed to this, when ΔAF<0, the routine proceeds to step 321, where the air-fuel ratio AF is made the target air-fuel ratio found from the maps from FIGS. 14A to 14D. Next, the routine proceeds to step 322, where the prohibit flag is set.

That is, if the differential pressure ΔP becomes negative when the opening degree of the throttle valve 16 and the opening degree of the EGR control valve 23 are controlled for low temperature combustion, the air-fuel ratio is gradually made larger. At this time, if ΔP becomes equal to or larger than 0, low temperature combustion is continued. As opposed to this, when ΔP<0 even when the correction value ΔAF becomes negative, that is, the air-fuel ratio AF has become larger than the target air-fuel ratio found from the maps of FIGS. 14A to 14D, the prohibit flag is set and the second combustion is switched to.

Next, an explanation will be given of another embodiment of the control of the operation with reference to FIG. 25 to FIG. 27. Note that in this embodiment, when low temperature combustion is to be performed and the differential pressure ΔP (=$P_1$-$P_0$) exceeds the upper limit α, the injection start timing θS is delayed, while when the differential pressure ΔP becomes a negative value, the injection start timing θS is advanced. That is, the differential pressure ΔP is held in a predetermined range where it is larger than zero and smaller than the upper limit α. Further, when the differential pressure ΔP does not become lower than the upper limit α even when the injection start timing θS is delayed, the second combustion is switched to. Further, when the differential pressure ΔP does not become higher than zero even when the injection start timing θS is advanced, the second combustion is switched to.

Figure 25:
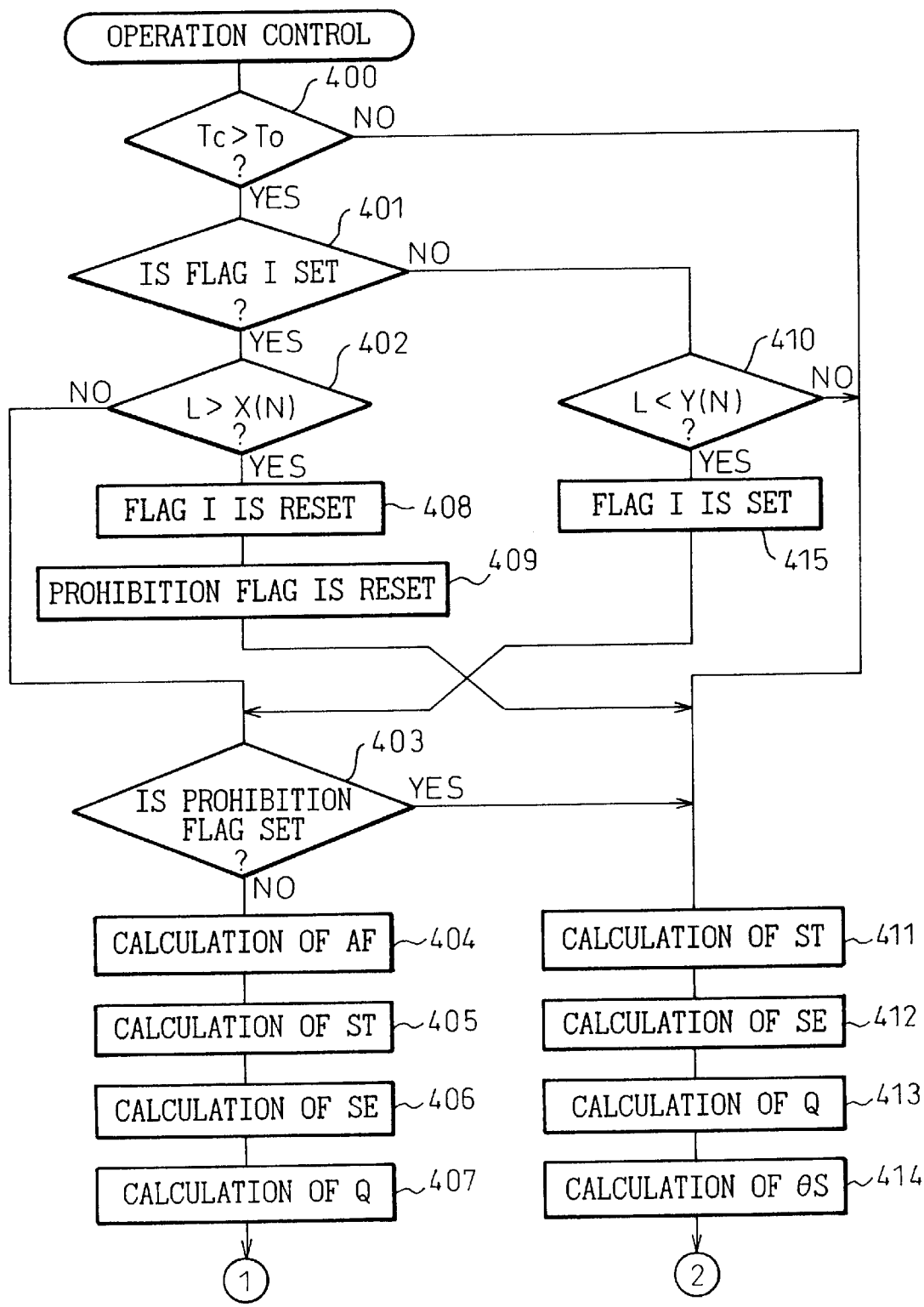
FIGS. 25 and 26 are flow charts of another embodiment for control of engine operation.
Figure 26:
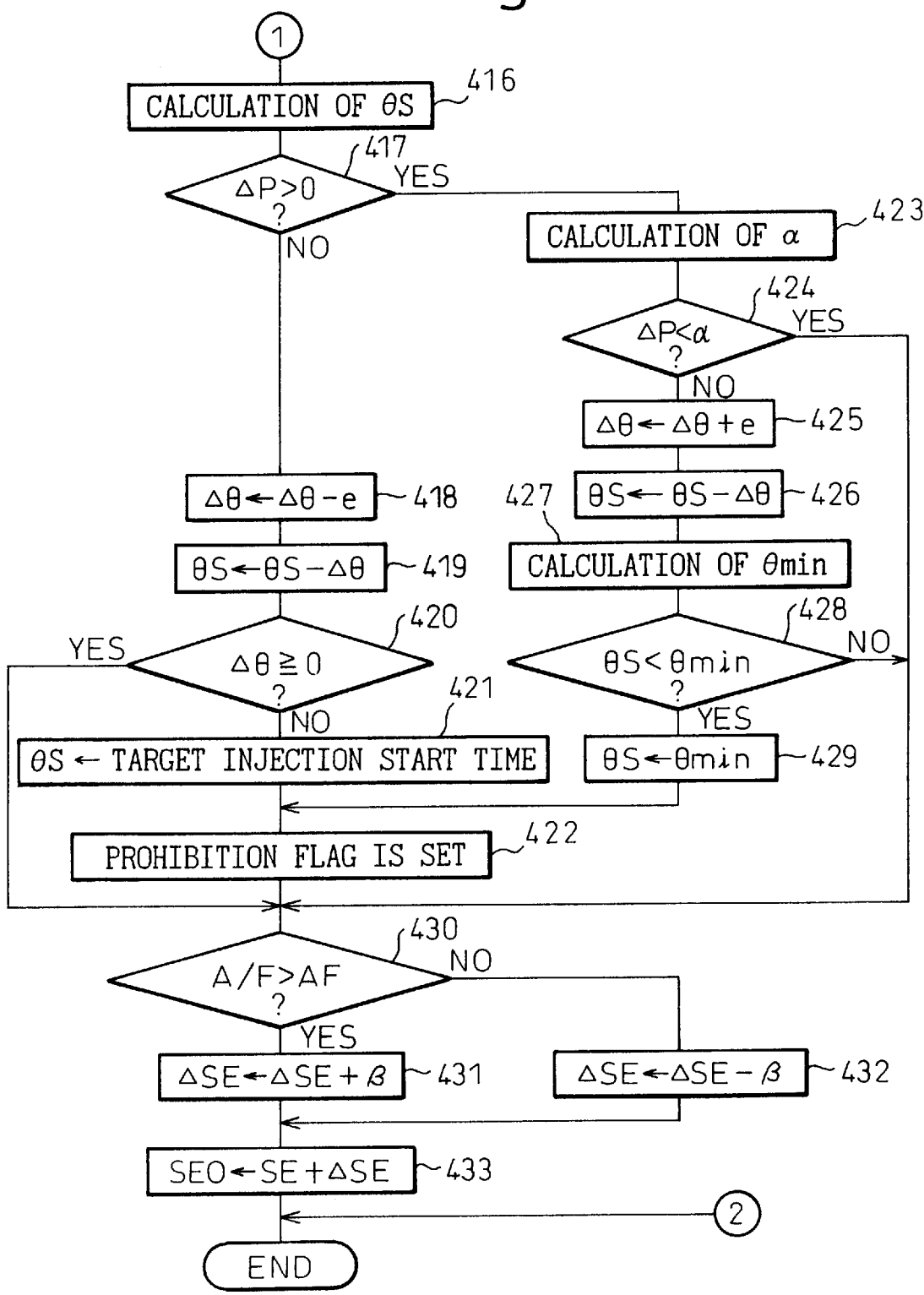

Referring to FIG. 25 and FIG. 26, first, at step 400, it is judged if the temperature Tc of the exhaust gas passing through the catalyst 19 is higher than a predetermined $T_0$, that is, if the catalyst 19 has been activated or not, based on the output signal of the temperature sensor 45. When Tc≦$T_0$, that is, when the catalyst 19 has not been activated, the routine proceeds to step 411, where second combustion, that is, combustion by the conventional combustion method, is performed.

That is, at step 411, the target opening degree ST of the throttle valve 16 is calculated from the map shown in FIG. 18A, then at step 412 the target opening degree SE of the EGR control valve 23 is calculated from the map shown in FIG. 18B. Next, at step 413, the injection amount Q is calculated, then at step 414, the injection start timing θS is calculated.

When it is judged at step 400 that Tc>$T_0$, that is, when the catalyst 19 is activated, the routine proceeds to step 401, where it is judged if a flag I showing that the engine operating region is the first operating region I is set or not. When the flag I is set, that is, when the engine operating region is the first operating region I, the routine proceeds to step 402, where it is judged if the required load L has become larger than the first boundary X(N) or not. When L≦X(N), the routine proceeds to step 403.

At step 403, it is judged if a prohibit flag indicating that first combustion, that is, low temperature combustion, should be prohibited has been set or not. When the prohibit flag has not been set, that is, when low temperature combustion is to be performed, the routine proceeds to step 404, where the opening degree of the throttle valve 16 and the opening degree of the EGR control valve 23 are controlled for the low temperature combustion.

That is, at step 404, the two maps corresponding to K(T) out of the maps shown from FIGS. 14A to 14D are used to calculate the target air-fuel ratio AF by proportional distribution. Next, at step 405, the two maps corresponding to the target air-fuel ratio AF out of the maps shown from FIGS. 15A to 15D are used to calculate the target opening degree ST of the throttle valve 16 by proportional distribution. The opening degree of the throttle valve 16 is controlled to the target opening degree ST. Next, at step 406, the two maps corresponding to the target air-fuel ratio AF out of the maps shown from FIGS. 16A to 16D are used to calculate the target basic opening degree SE of the EGR control valve 23 by proportional distribution. Next, at step 407, the injection amount Q is calculated, then, at step 416, the injection start timing θS is calculated. This target injection start timing θS, as shown in FIG. 27A, is stored as a function of the required load L and the engine rotational speed N in the form of a map in advance in the ROM 32. Next, the routine proceeds to step 417.

At step 417, it is judged if the differential pressure ΔP (=$P_1$-$P_0$) is larger than zero or not. When ΔP≧0, the routine proceeds to step 423, where the upper limit α is calculated from the map shown in FIG. 20C. Next, at step 424, it is judged if the differential pressure ΔP is smaller than the upper limit α or not. When ΔP<α, the routine jumps to step 430. That is, when 0≦ΔP<α, the routine jumps to step 430.

At step 430, it is judged if the actual air-fuel ratio A/F detected by the air-fuel ratio sensor 21 is larger than the target air-fuel ratio AF or not. When A/F >AF, the routine proceeds to step 431, where a predetermined value β is added to the correction value ΔSE for the opening degree of the EGR control valve 23, then the routine proceeds to step 433. As opposed to this, when A/F≦AF, the routine proceeds to step 432, where the predetermined value β is subtracted from the correction value ΔSE, then the routine proceeds to step 433. At step 433, the correction value ΔSE is added to the target opening basic degree SE of the EGR control valve 23 to calculate the target opening degree SE0 of the EGR control valve 23. The opening degree of the EGR control valve 23 is controlled to this target opening degree SE0. That is, the opening degree of the EGR control valve 23 is controlled to control the actual air-fuel ratio to the target air-fuel ratio AF. Of course, in this case, it is also possible to control the opening degree of the throttle valve 16 to control the actual air-fuel ratio to the target air-fuel ratio AF.

When the opening degree of the throttle valve 16 and the opening degree of the EGR control valve 23 are controlled for the low temperature combustion in this way, if the differential pressure ΔP is within the predetermined range (0≦ΔP<α), that is, if good low temperature combustion is being performed, the low temperature combustion is continued as it is. At this time, the actual air-fuel ratio is controlled to the target air-fuel ratio AF.

On the other hand, when it is judged at step 402 that L>X(N), the routine proceeds to step 408, where the flag I is reset, then the prohibit flag is reset at step 409. Next, the routine proceeds to step 411, where the second combustion, that is, the conventionally performed normal combustion, is performed.

On the other hand, when it is judged at step 401 that the flag I has been reset, that is, when the engine is operating in the second operating region II, the routine proceeds to step 410, where it is judged if the required load L has become smaller than the second boundary Y(N) or not. When L≧Y(N), the routine proceeds to step 411. As opposed to this, when L<Y(N), the routine proceeds to step 415, where the flag I is set. Next, the routine proceeds to step 403, where the opening an degree of the throttle valve 16 and the opening degree of the EGR control valve 23 are controlled for low temperature combustion.

On the other hand, when it is judged at step 424 that ΔP≧α, the routine proceeds to step 425, where the predetermined value e is added to the correction value Δθ of the target injection start timing θS. Next, at step 426, the correction value Δθ is subtracted from the target injection start timing θS, whereby the injection start timing θS is delayed. Next, at step 427, the allowable maximum delay timing θmin is calculated. This allowable maximum delay timing θmin, as shown in FIG. 27B, is stored as a function of the required load L and the engine rotational speed N in advance in the ROM 32. Next, at step 428, it is judged if the injection start timing θS has become later than the allowable maximum delay timing θmin or not, that is, if θS<θmin. If θS≧θmin, the routine jumps to step 429. As opposed to this, if θS<θmin, the routine proceeds to step 429, where the injection start timing θS is made the allowable maximum delay timing θmin, then the routine proceeds to step 422, where the prohibit flag is set.

That is, when the opening degree of the throttle valve 16 and the opening degree of the EGR control valve 23 are controlled for low temperature combustion, if the differential pressure ΔP becomes larger than the upper limit α, the injection start timing is gradually delayed. At this time, if ΔP becomes smaller than α, low temperature combustion is performed. As opposed to this, when ΔP≧α even when the injection start timing is delayed to the allowable maximum delay timing θmin, the prohibit flag is set. If the prohibit flag is set, the routine proceeds from step 403 to step 411, then the second combustion is switched to.

The prohibit flag is reset when it is judged at step 402 that L>X(N), that is, when the engine is operating in the second operating region II. Therefore, when the prohibit flag is set when the engine is operating in the first operating region I, the engine then changes to operate in the second operating region II and second combustion is continued until the first operating region is again switched to.

On the other hand, when it is judged at step 417 that the differential pressure ΔP has become negative, the routine proceeds to step 418, where the predetermined value e is subtracted from the correction value Δθ. Next, at step 419, the correction value Δθ is subtracted from the target injection start timing θS, at which time the injection start timing θS is advanced. Next, at step 420, it is judged if the correction value Δθ is larger than zero. When Δθ≧0, the routine jumps to step 430. As opposed to this, when Δθ<0, the routine proceeds to step 421, where the injection start timing θS is made the target injection start timing found from the map from FIG. 27A. Next, the routine proceeds to step 422, where the prohibit flag is set.

That is, if the differential pressure ΔP becomes negative when the opening degree of the throttle valve 16 and the opening degree of the EGR control valve 23 are controlled for low temperature combustion, the injection start timing is gradually advanced. At this time, if ΔP becomes equal to or larger than 0, low temperature combustion is continued. As opposed to this, when ΔP<0 even when the correction value Δθ becomes negative, that is, the injection start timing has become advanced to the target injection start timing found from the map of FIG. 27A, the prohibit flag is set and the second combustion is switched to.

Figure 28:
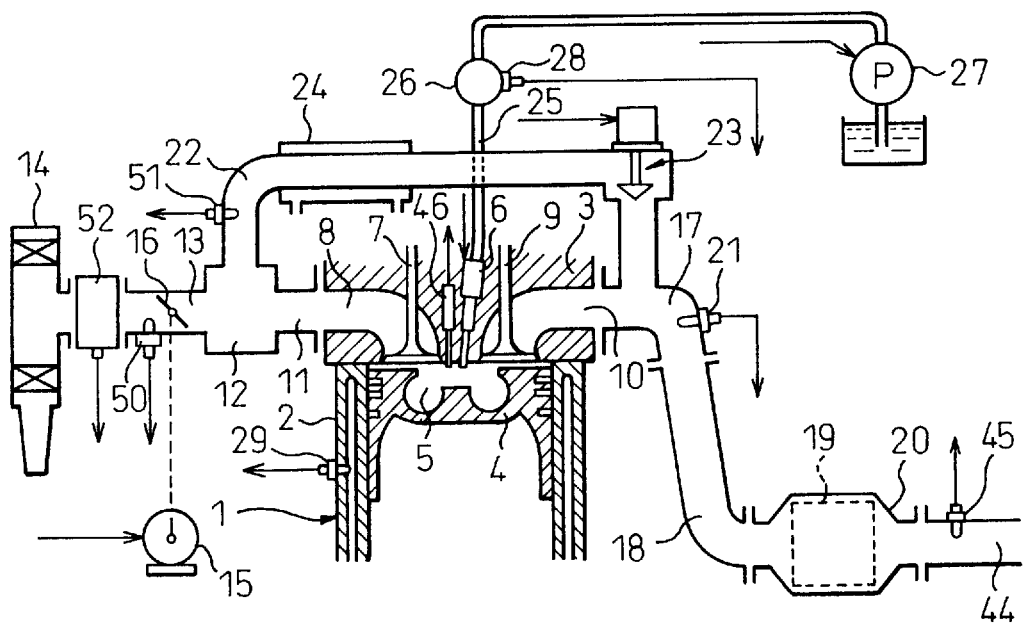
FIG. 28 is an overview of a compression ignition type engine.

In the embodiments described up to here, the temperature of the mixed gas of the suction air and the EGR gas was used as the temperature TG in the combustion chamber 5 at the start of compression. It is however also possible to separately detect the suction air temperature T(A) and the EGR gas temperature T(E) and find the temperature TG in the combustion chamber 5 at the start of the compression from the suction air temperature T(A) and the EGR gas temperature T(E). FIG. 28 shows an overall view of a compression ignition type engine suited for this case. In this engine, a temperature sensor 50 for detecting the suction air temperature T(A) is arranged in the intake duct 13, while a temperature sensor 51 for detecting the EGR gas temperature T(E) is arranged in the EGR passage 22. The output signals of these temperature sensors 50 and 51 are input through the corresponding AD converters 37 (FIG. 1) to the input port 35 (FIG. 1). Further, in this embodiment, an air flow meter 52 is provided for detecting the amount of suction air. The output signal of this air flow meter 52 is input through the corresponding AD converter 37 (FIG. 1) to the input port 35 (FIG. 1).

In this embodiment, the temperature TG in the combustion chamber 5 at the start of compression is calculated based on the following formula:

$$TG = (GA \cdot T(A) + GE \cdot T(E))/(GA+GE)$$

Here, GA shows the amount of the suction air, while GE shows the amount of the EGR gas. The amount of suction air GA is calculated from the output signal of the air flow meter 52, while the amount of the EGR gas GE is calculated from the amount of suction air GA and the target EGR rate.

That is, in the above formula, GA·T(A) indicates the amount of heat of the suction air supplied into the combustion chamber 5, while GE·T(E) indicates the amount of heat of the EGR gas supplied into the combustion chamber 5. The sum of these heats is the amount of heat of the mixed gas of the suction air and EGR gas supplied into the combustion chamber 5. If the temperature of the mixed gas is made TG, the amount of heat of the mixed gas is expressed as TG·(GA+GE). Therefore, the temperature TG of the mixed gas is expressed by the above formula. In this embodiment, the temperature of the mixed gas is used as the temperature TG inside the combustion chamber 5 at the start of compression.

Note that when not that accurate control is required, it is also possible to use the suction air temperature T(A) as the temperature TG in the combustion chamber 5 at the start of compression. It is also possible to use the EGR gas temperature T(E).

According to the present invention, as mentioned above, it is possible to perform low temperature combustion with almost no generation of soot and NOx while preventing unburnt hydrocarbons from being discharged to the outside air. While the invention has been described by reference to specific embodiments chosen for purposes of illustration, it should be apparent that numerous modifications could be made thereto by those skilled in the art without departing from the basic concept and scope of the invention.

We claim:

1. A compression ignition type engine in which an amount of production of soot gradually increases and then peaks when an amount of inert gas in a combustion chamber increases and in which a further increase of the amount of inert gas in the combustion chamber results in a temperature of fuel and surrounding gas at the time of combustion in the combustion chamber becoming lower than a temperature of production of soot and therefore almost no production of soot any longer, said engine comprising:

switching means for selectively switching between a first combustion where the amount of the inert gas in the combustion chamber is larger than the amount of inert gas where the amount of production of soot peaks and almost no soot is produced and a second combustion where the amount of inert gas in the combustion chamber is smaller than the amount of inert gas where the amount of production of soot peaks;

a catalyst having an oxidation function arranged in an exhaust passage of the engine; and activation judging means for judging if the catalyst is activated or not; said switching means making the second combustion be performed and the first combustion not be performed when the catalyst is not activated.

2. A compression ignition type engine as set forth in claim 1, wherein detecting means is provided for detecting a representative temperature representing a temperature of said catalyst and wherein said activation judging means judges that the catalyst has been activated when said representative temperature exceeds a predetermined temperature.

3. A compression ignition type engine as set forth in claim 1, wherein the catalyst is at least one of an oxidation catalyst, three-way catalyst, and NOx absorbent.

4. A compression ignition type engine as set forth in claim 1, wherein an exhaust gas recirculation apparatus is provided for recirculating exhaust gas exhausted from the combustion chamber into an engine intake passage and the inert gas is comprised of recirculated exhaust gas.

5. A compression ignition type engine as set forth in claim 4, wherein the exhaust gas recirculation rate when the first combustion is being performed is at least about 55 percent.

6. A compression ignition type engine as set forth in claim 1, wherein temperature of fuel and surrounding gas at the time of combustion in a first combustion state is a temperature giving an amount of NOx in exhaust gas of around 10 ppm or less.

7. A compression ignition type engine as set forth in claim 1, wherein, in a first combustion state, unburnt hydrocarbons are exhausted from the combustion chamber not in the form of soot, but in the form of a soot precursor or form before that and wherein the unburnt hydrocarbons exhausted from the combustion chamber are oxidized by said catalyst.

8. A compression ignition type engine as set forth in claim 1, wherein an engine operating region is divided into a low load side first operating region where the first combustion is performed and a high load side second operating region where the second combustion is performed and said switching means makes the first combustion be performed if the catalyst is activated when the engine is operating in the first operating region and makes the second combustion be performed if the catalyst is not activated when the engine is operating in the first operating region.

9. A compression ignition type engine as set forth in claim 8, wherein the first operating region is expanded to the high load side the lower temperature of gas in the combustion chamber at the start of compression.

10. A compression ignition type engine as set forth in claim 9, wherein an exhaust gas recirculation apparatus is provided for recirculating exhaust gas exhausted from the combustion chamber into an engine intake passage and the temperature of the gas in the combustion chamber at the start of compression is temperature of mixed gas of the recirculated exhaust gas and the suction gas.

11. A compression ignition type engine as set forth in claim 8, wherein the first operating region is expanded to the high load side the smaller the difference between a cylinder inner wall temperature and temperature of gas in the combustion chamber at the start of compression.

12. A compression ignition type engine as set forth in claim 8, wherein, in the first operating region, an air-fuel ratio is made larger the lower a required load.

13. A compression ignition type engine as set forth in claim 12, wherein the air-fuel ratio at the same required load and same engine rotational speed is made larger along with an expansion of the first operating region.

14. A compression ignition type engine as set forth in claim 1, wherein combustion state judging means is provided for judging if a combustion state where almost no soot is produced can be maintained when the first combustion is being performed and wherein said switching means switches from the first combustion to the second combustion when it is judged that the combustion state where almost no soot is produced cannot be maintained when the first combustion is being performed.

15. A compression ignition type engine as set forth in claim 14, wherein, when the first combustion is being performed, a first peak of pressure in the combustion chamber appears at substantially top dead center of a compression stroke and a second peak of combustion pressure appears after top dead center of the compression stroke, a combustion pressure sensor for detecting the first peak pressure and the second peak pressure is provided, and said combustion state judging means judges that a combustion state where no soot is produced is being maintained when the second peak pressure is in a predetermined range of pressure based on the first peak pressure.

16. A compression ignition type engine as set forth in claim 15, wherein air-fuel ratio control means is provided for reducing an air-fuel ratio when the second peak pressure exceeds said range of pressure and increasing the air-fuel ratio when the second peak pressure has become smaller than a lower limit of said range of pressure.

17. A compression ignition type engine as set forth in claim 15, wherein injection timing control means is provided for delaying an injection timing when the second peak pressure exceeds an upper limit of said range of pressure and advancing the injection timing when the second peak pressure has become smaller than a lower limit of said range of pressure.

* * * * *